US011375511B2

(12) United States Patent
Jung et al.

(10) Patent No.: US 11,375,511 B2
(45) Date of Patent: Jun. 28, 2022

(54) METHOD FOR TRANSMITTING AND RECEIVING SLOT SETTING INFORMATION IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 242 days.

(21) Appl. No.: 16/636,587

(22) PCT Filed: Aug. 3, 2018

(86) PCT No.: PCT/KR2018/008858
§ 371 (c)(1),
(2) Date: Jun. 29, 2020

(87) PCT Pub. No.: WO2019/035584
PCT Pub. Date: Feb. 21, 2019

(65) Prior Publication Data
US 2021/0168807 A1 Jun. 3, 2021

(30) Foreign Application Priority Data

Aug. 14, 2017 (KR) ........................ 10-2017-0102973
Sep. 29, 2017 (KR) ........................ 10-2017-0128144
Mar. 7, 2018 (KR) ........................ 10-2018-0027086

(51) Int. Cl.
*H04W 72/04* (2009.01)
*H04W 76/27* (2018.01)
(Continued)

(52) U.S. Cl.
CPC ... *H04W 72/0493* (2013.01); *H04L 27/26025* (2021.01); *H04W 72/042* (2013.01);
(Continued)

(58) Field of Classification Search
CPC ........... H04W 72/0493; H04W 72/042; H04W 72/0446; H04W 72/1289; H04W 76/27; H04L 27/26025
(Continued)

(56) References Cited

U.S. PATENT DOCUMENTS 7,894,391 B2  2/2011  Kwon et al.
2013/0286902 A1  10/2013  Chen et al.
(Continued)

FOREIGN PATENT DOCUMENTS

| EP | 2165570 B1 | 6/2015 |
|---|---|---|
| WO | 2013/112372 A1 | 8/2013 |
| WO | 2013/170415 A1 | 11/2013 |

OTHER PUBLICATIONS

CATT, "Group-common PDCCH Structure and Configuration", R1-1707500, 3GPP TSG RAN WG1 Meeting #89, Hangzhou, P. R. China, May 6, 2017.
(Continued)

*Primary Examiner* — Peter G Solinsky
(74) *Attorney, Agent, or Firm* — Rabin & Berdo, P.C.

(57) ABSTRACT

A method for transmitting and receiving slot setting information in a communication system is disclosed. An operating method of a UE comprises the steps of: receiving, from a base station, a first upper layer message including SFI for indicating a format of a slot; receiving, from the base station, DCI or a second upper layer message for indicating a use of a flexible symbol belonging to the slot set by the SFI; and determining the flexible symbol belonging to the slot as a DL symbol or a UL symbol on the basis of the second upper (Continued)

layer message or the DCI. Therefore, a performance of a communication system can be improved.

11 Claims, 20 Drawing Sheets

(51) Int. Cl.
*H04L 27/26* (2006.01)
*H04W 72/12* (2009.01)

(52) U.S. Cl.
CPC ... *H04W 72/0446* (2013.01); *H04W 72/1289* (2013.01); *H04W 76/27* (2018.02)

(58) Field of Classification Search
USPC .......................................................... 370/329
See application file for complete search history.

(56) References Cited

U.S. PATENT DOCUMENTS

| | | | |
|---|---|---|---|
| 2015/0117270 A1 | 4/2015 | Um et al. | |
| 2015/0201431 A1 | 7/2015 | Um et al. | |
| 2017/0331611 A1 | 11/2017 | Stern-Berkowitz et al. | |
| 2017/0332396 A1 | 11/2017 | Liao et al. | |
| 2020/0275417 A1* | 8/2020 | Takeda | H04L 5/0007 |

OTHER PUBLICATIONS

Intel Corporation, "Group-common PDCCH: Contents", R1-1707385, 3GPP TSG RAN WG1 #89, Hangzhou, P. R. China, May 7, 2017.
Mediatek Inc., "Contents of GC PDCCH", R1-1713679, 3GPP TSG RAN WG1 Meeting #90, Prague, P.R. Czechia, Aug. 12, 2017.
NTT DOCOMO, Inc., "Open Issues List and Comments for AI 7.1.3.1", R1-1709386, 3GPP TSG-RAN WG1 #89, Hangzhou, P.R. China, May 17, 2017.
Samsung, "DCI Contents for NR", R1-1707995, 3GPP TSG RAN WG1 Meeting #89, Hangzhou, China, May 6, 2017.
Wilus Inc., "UE Procedure for Group Common PDCCH for NR", R1-1708975, 3GPP TSG RAN WG1 Meeting #89, Hangzhou, P. R. China, May 7, 2017.

* cited by examiner

METHOD FOR TRANSMITTING AND RECEIVING SLOT SETTING INFORMATION IN COMMUNICATION SYSTEM

TECHNICAL FIELD

The present invention relates to a technique for configuring a slot, and more particularly, to a method for transmitting and receiving configuration information indicating a structure of a slot constituting a subframe in a communication system.

BACKGROUND ART

With the development of information and communication technology, various wireless communication technologies are being developed. Typical wireless communication technologies include long term evolution (LTE), new radio (NR), or the like defined as the 3rd generation partnership project (3GPP) standard. The LTE may be one of 4th generation (4G) wireless communication technologies, and the NR may be one of 5th generation (5G) wireless communication technologies.

A 5G communication system (e.g., communication system supporting the NR) using a frequency band (e.g., frequency band above 6 GHz) higher than a frequency band (e.g., frequency band below 6 GHz) of a 4G communication system (e.g., communication system supporting the LTE) as well as the frequency band of the 4G communication system has been considered for processing of wireless data which has rapidly increased since commercialization of the 4G communication system. The 5G communication system can support Enhanced Mobile Broadband (eMBB), Ultra-Reliable and Low-Latency Communication (URLLC), and massive Machine Type Communication (mMTC).

In order to support the services described above (e.g., eMBB, URLLC, mMTC, etc.) in the 5G communication system, it is necessary to support a flexible frame and slot structure. Accordingly, a structure of a slot constituting a subframe may be different for each slot. In this case, there is a need for an efficient signaling method for informing the terminal of configuration information indicating the slot structure.

Meanwhile, the technology as the background of the invention is intended to enhance understanding of the background of the invention, and may include contents that are not known to the person of ordinary skill in the art.

DISCLOSURE

Technical Problem

The objective of the present invention to solve the above-described problem is to provide a method for transmitting and receiving configuration information indicating a structure of a slot constituting a subframe in a communication system.

Technical Solution

An operation method of a UE, according to a first embodiment of the present invention for achieving the above-described objective, may comprise receiving from a base station a first upper layer message including an SFI indicating a format of a slot; receiving from the base station a second upper layer message or a DCI indicating a use of a flexible symbol belonging to the slot configured by the SFI; and determining the flexible symbol belonging to the slot as a DL symbol, a UL symbol, or a flexible symbol based on the second upper layer message or the DCI.

Here, the first upper layer message may further include information indicating a slot configuration period for which the SFI is applied.

Here, the SFI may indicate a number of DL symbols and a number of UL symbols included in the slot.

Here, the first upper layer message may be a cell-specific RRC message and the second upper layer message may be a UE-specific RRC message.

Here, the DCI may include scheduling information indicating whether the flexible symbol belonging to the slot is used for downlink transmission or uplink transmission.

Here, the slot configured by the SFI may include DL symbol, UL symbol, and flexible symbol.

Here, the operation method may further comprise, when the flexible symbol belonging to the slot is determined as a DL symbol, receiving from the base station at least one of a DL channel and a DL signal in the flexible symbol.

Here, the operation method may further comprise, when the flexible symbol belonging to the slot is determined as a UL symbol, transmitting to the base station at least one of a UL channel and a UL signal in the flexible symbol.

Here, an operation for transmitting or receiving a channel or a signal may not be performed in the flexible symbol when the flexible symbol belonging to the slot is determined to be maintained based on the second upper layer message or the DCI.

An operation method of a base station, according to a second embodiment of the present invention for achieving the above-described objective, may comprise transmitting a first upper layer message including an SFI indicating a format of a slot; and transmitting a second upper layer message or a DCI indicating a use of a flexible symbol belonging to the slot configured by the SFI, wherein the flexible symbol belonging to the slot is determined as a DL symbol, a UL symbol, or a flexible symbol based on the second upper layer message or the DCI.

Here, the first upper layer message may further include information indicating a slot configuration period for which the SFI is applied.

Here, the SFI may indicate a number of DL symbols and a number of UL symbols included in the slot.

Here, the first upper layer message may be a cell-specific RRC message and the second upper layer message is a UE-specific RRC message.

Here, the DCI may include scheduling information indicating whether the flexible symbol belonging to the slot is used for downlink transmission or uplink transmission.

Here, the operation method may further comprise, when the flexible symbol belonging to the slot is determined as a DL symbol, transmitting to the UE at least one of a DL channel and a DL signal in the flexible symbol.

Here, the operation method may further comprise, when the flexible symbol belonging to the slot is determined as a UL symbol, receiving from the UE at least one of a UL channel and a UL signal in the flexible symbol.

An operation method of a UE, according to a third embodiment of the present invention for achieving the above-described objective, may comprise receiving from a base station an SFI indicating a format of a slot #i belonging to a bandwidth part #1 having a subcarrier spacing of m kHz; determining types of symbols included in the slot #i based on the SFI; and determining types of symbols included in slots #j to #(j+$2^u$−1) belonging to a bandwidth part #2 having a subcarrier spacing of $2^u$×m kHz based on the SFI, wherein m is 15, 30, 60, 120 or 240, u is an integer equal to or greater than 1, each of i and j is an integer equal to or greater than 0, and a type of each of the symbols is a DL symbol, a flexible symbol, or a UL symbol.

Here, types of 2u consecutive symbols included in the slots #j to #(j+2$^u$−1), which are aligned in time axis with one symbol included in the slot #i, may be determined to be identical to a type of the one symbol included in the slot #i.

Here, a type of a symbol #p belonging to each of the slots #j to #(j+2$^u$−1) may be determined to be identical to a type of a symbol #p belonging to the slot #i, a number of symbols belonging to each of the slots #j to #(j+2$^u$−1) may be equal to a number of symbols belonging to the slot #i, and p may be an integer equal to or greater than 0.

Here, the SFI may be received from the base station through a downlink control information (DCI), and the DCI may further include information indicating a slot configuration period for which the SFI is applied.

Advantageous Effects

According to the present invention, a slot structure in a communication system may be configured dynamically by a base station. A slot may be classified into a downlink (DL) symbol, a flexible symbol, and an uplink (UL) symbol, and the use (e.g., downlink transmission or uplink transmission) of the flexible symbol included in the slot may be configured dynamically by the base station.

Also, when a plurality of bandwidth parts are configured in the communication system and the base station transmits information indicating a slot structure for one bandwidth part among the plurality of bandwidth parts, a user equipment (UE) may determine a slot structure of the remaining bandwidth parts based on the information indicating the slot structure of the one bandwidth part. Therefore, the performance of the communication system can be improved.

MODES OF THE INVENTION

Figure 1:
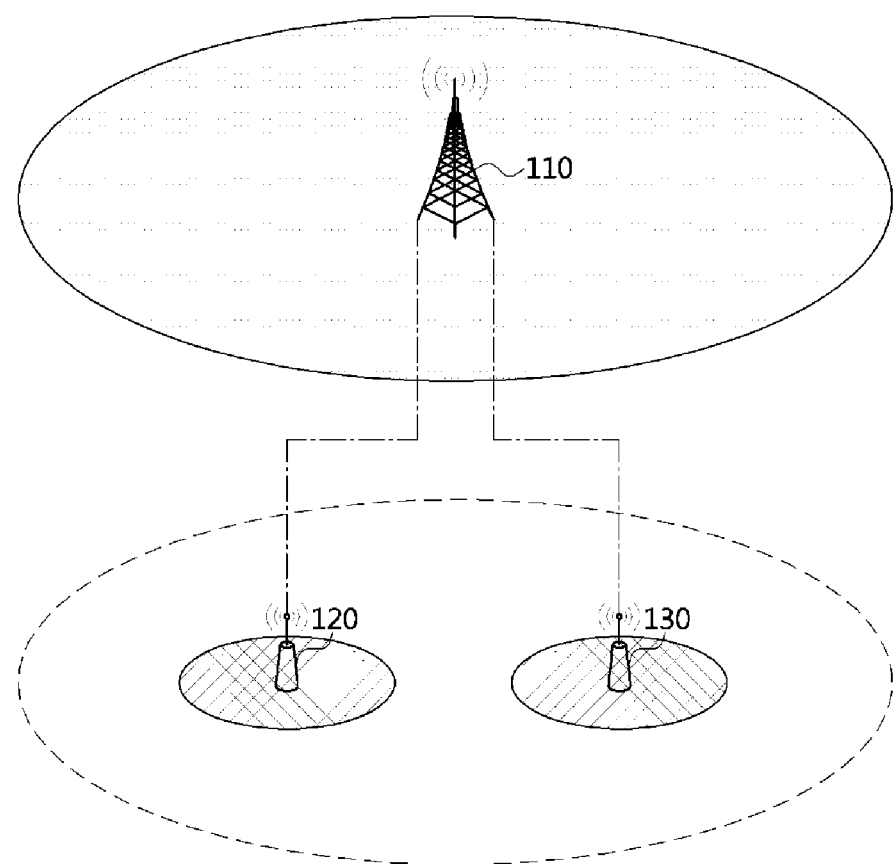
FIG. 1 is a conceptual diagram illustrating a first embodiment of a wireless communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which embodiments according to the present invention are applied will be described. The wireless communication network to which the embodiments according to the present invention are applied is not limited to the following description, and the embodiments according to the present invention can be applied to various wireless communication networks. Here, the wireless communication network may be used in the same sense as a wireless communication system.

FIG. 1 is a conceptual diagram illustrating a first embodiment of a wireless communication network.

Referring to FIG. 1, a first base station 110 may support a cellular communication (e.g., long term evolution (LTE), LTE-advance (LTE-A), new radio (NR), etc. specified in the 3$^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110 (e.g., LTE).

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110 (e.g., LTE). Each of the first base station 110 and a user equipment (UE) (not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, UE, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like. Among the communication nodes, the UE may be referred to as a terminal, an access terminal, a mobile terminal, a station, a subscriber station, a portable subscriber station, a mobile station, a node, a device, or the like. The communication node may have the following structure.

Figure 2:
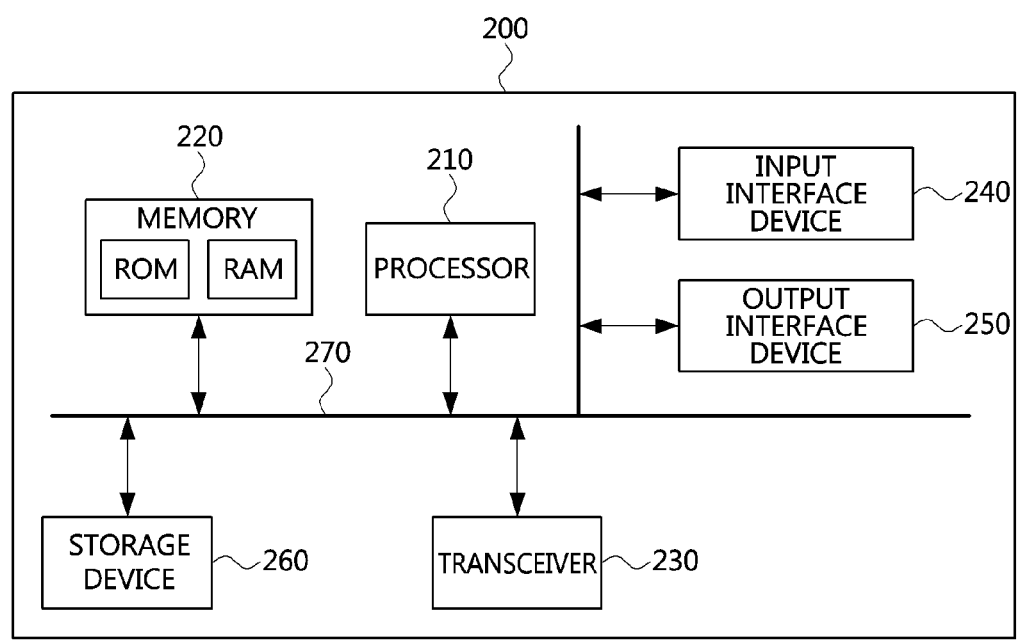
FIG. 2 is a block diagram illustrating a first embodiment of a communication node constituting a wireless communication network.

FIG. 2 is a block diagram illustrating a first embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Next, operation methods of a communication node in a wireless communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
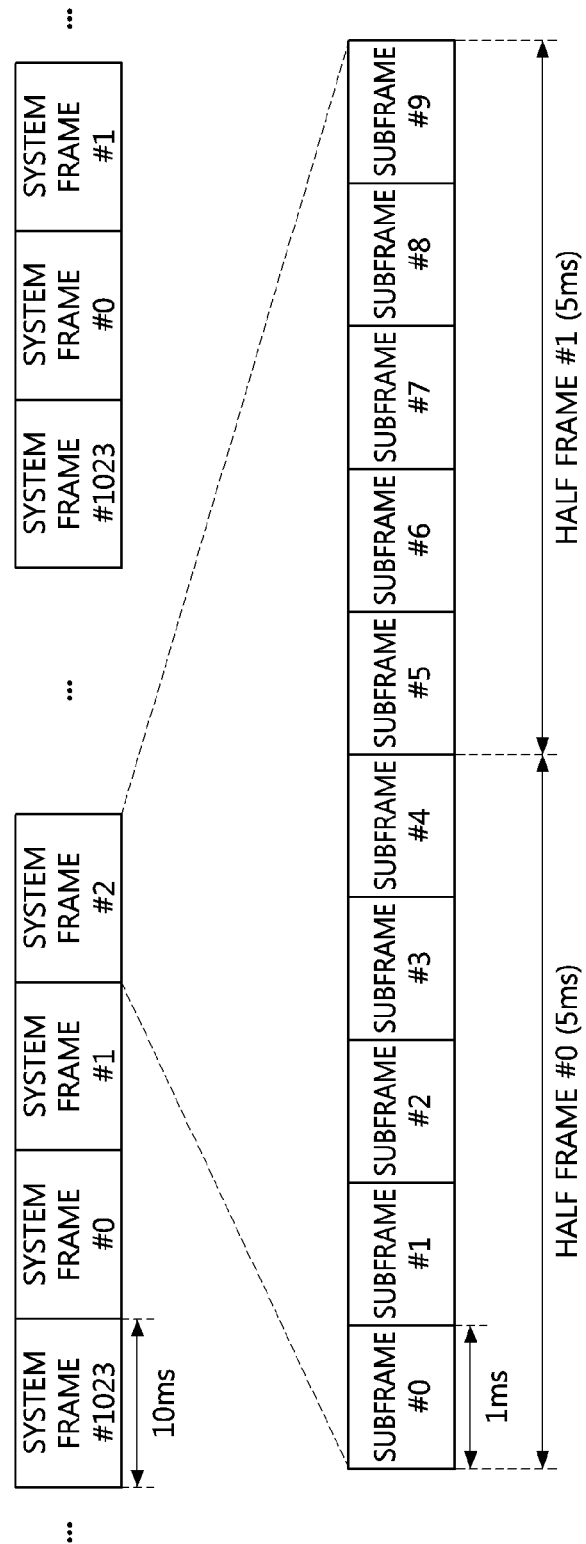
FIG. 3 is a conceptual diagram illustrating a first embodiment of a system frame configuration in a wireless communication network.

FIG. 3 is a conceptual diagram illustrating a first embodiment of a system frame configuration in a wireless communication network.

Referring to FIG. 3, time resources in a wireless communication network may be divided into frames. For example, system frames each of which has a length of 10 milliseconds (ms) may be configured consecutively in the time axis of the wireless communication network. System frame numbers (SFNs) may set to #0 to #1023. In this case, 1024 system frames may be repeated in the time axis of the wireless communication network. For example, an SFN of a system frame after the system frame #1023 may be set to #0. One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
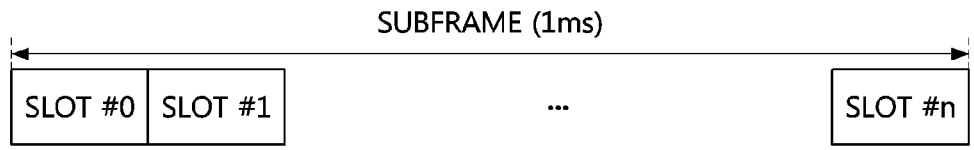
FIG. 4 is a conceptual diagram illustrating a first embodiment of a subframe configuration in a wireless communication network.

FIG. 4 is a conceptual diagram illustrating a first embodiment of a subframe configuration in a wireless communication network.

Referring to FIG. 4, one subframe may include n slots, and n may be an integer of 1 or more. Accordingly, one subframe may be composed of one or more slots.

Figure 5:
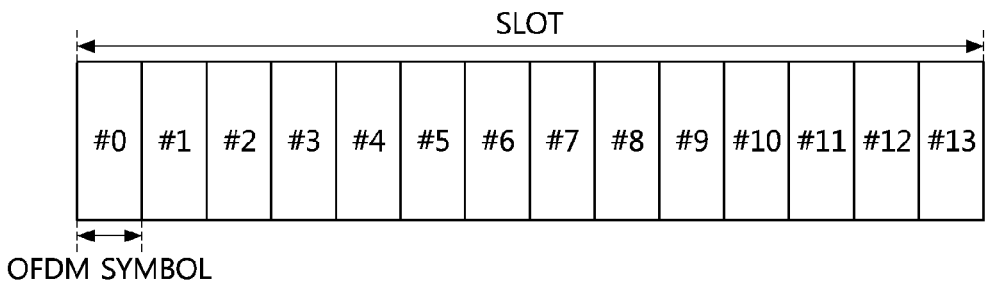
FIG. 5 is a conceptual diagram illustrating a first embodiment of a slot configuration in a wireless communication network.

FIG. 5 is a conceptual diagram illustrating a first embodiment of a slot configuration in a wireless communication network.

Referring to FIG. 5, one slot may comprise one or more OFDM symbols. For example, one slot may be composed of 14 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 6:
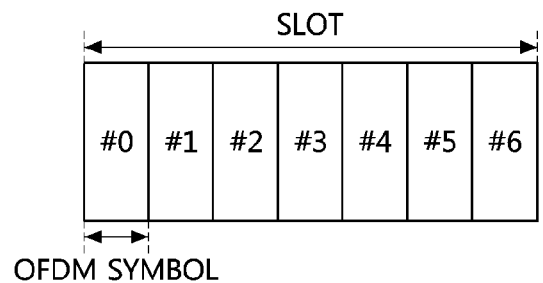
FIG. 6 is a conceptual diagram illustrating a second embodiment of a slot configuration in a wireless communication network.

FIG. 6 is a conceptual diagram illustrating a second embodiment of a slot configuration in a wireless communication network.

Referring to FIG. 6, one slot may comprise 7 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 7:
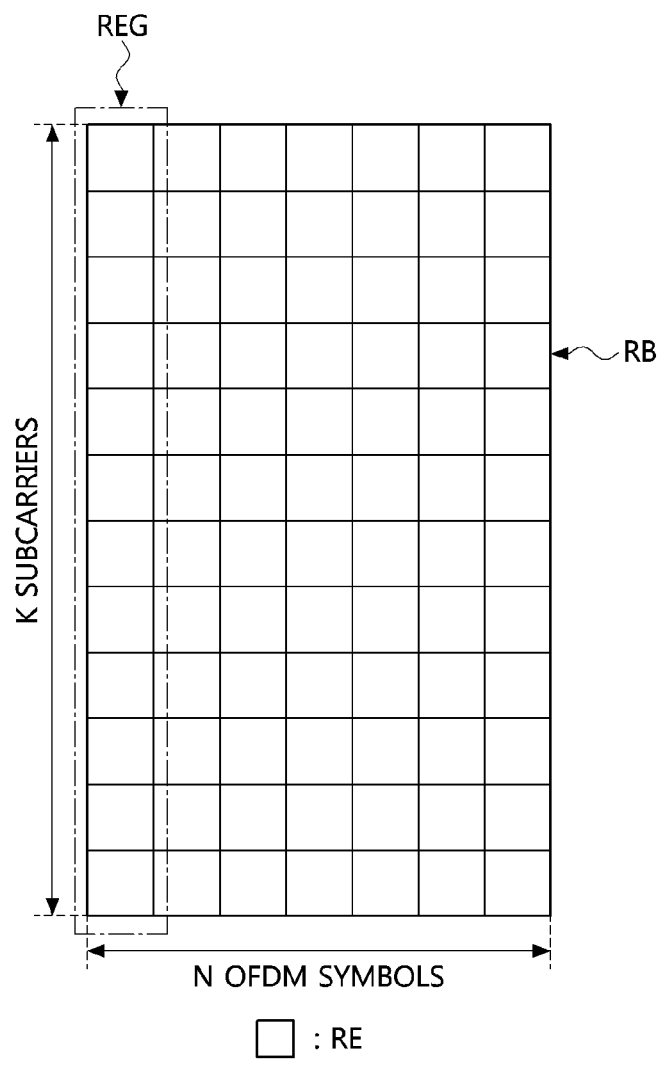
FIG. 7 is a conceptual diagram illustrating a first embodiment of time-frequency resources in a wireless communication network.

FIG. 7 is a conceptual diagram illustrating a first embodiment of time-frequency resources in a wireless communication network.

Referring to FIG. 7, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. Here, K may be 12. Resources configured with N OFDM symbols in the time axis and K subcarriers in the frequency axis may be defined as a 'resource block (RB)'. Here, N may be 6, 7, or 14. The RB may be used as a basic unit of data resource allocation.

Figure 8:
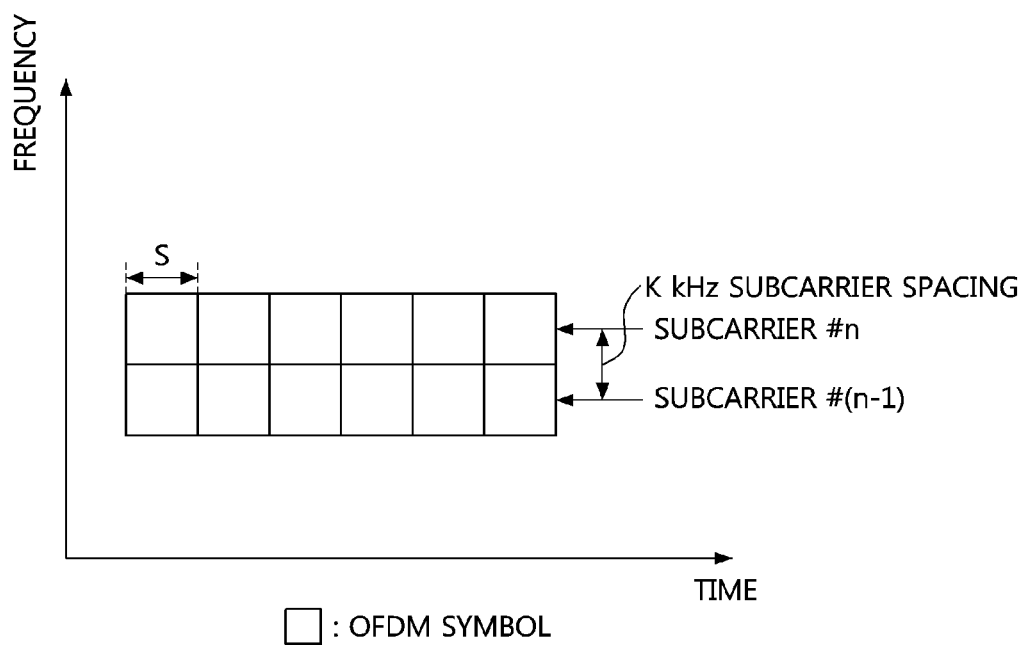
FIG. 8 is a conceptual diagram illustrating a first embodiment of time-frequency resources according to a subcarrier spacing in a wireless communication network.
Figure 9:
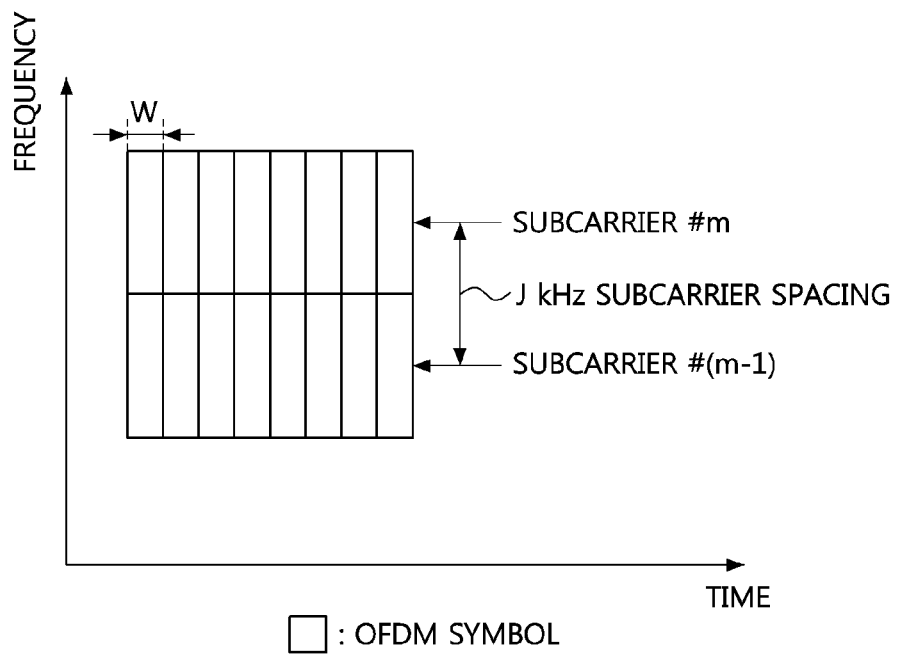
FIG. 9 is a conceptual diagram illustrating a second embodiment of time-frequency resources according to a subcarrier spacing in a wireless communication network.

FIG. 8 is a conceptual diagram illustrating a first embodiment of time-frequency resources according to a subcarrier spacing in a wireless communication network, and FIG. 9 is a conceptual diagram illustrating a second embodiment of time-frequency resources according to a subcarrier spacing in a wireless communication network.

Referring to FIG. 8, in a wireless communication network in which a K kHz subcarrier spacing is used, the length of one OFDM symbol may be S ms. Referring to FIG. 9, in a wireless communication network in which a J kHz subcarrier spacing is used, the length of one OFDM symbol may be W ms. When the subcarrier spacing J kHz is twice the subcarrier spacing K kHz (i.e., J=2K), the length of the OFDM symbol (i.e., W ms) in FIG. 9 may be half the length of the OFDM symbol (i.e., S ms) in FIG. 8. In this case, W=S/2.

In the wireless communication network, the subcarrier spacing may be variably configured. For example, in a wireless communication network in which a 15 kHz subcarrier spacing is used, the length of the OFDM symbol may be 1/15000 second (s). In this case, the length of one slot composed of 7 OFDM symbols shown in FIG. 6 may be 7/15000 s.

Figure 10:
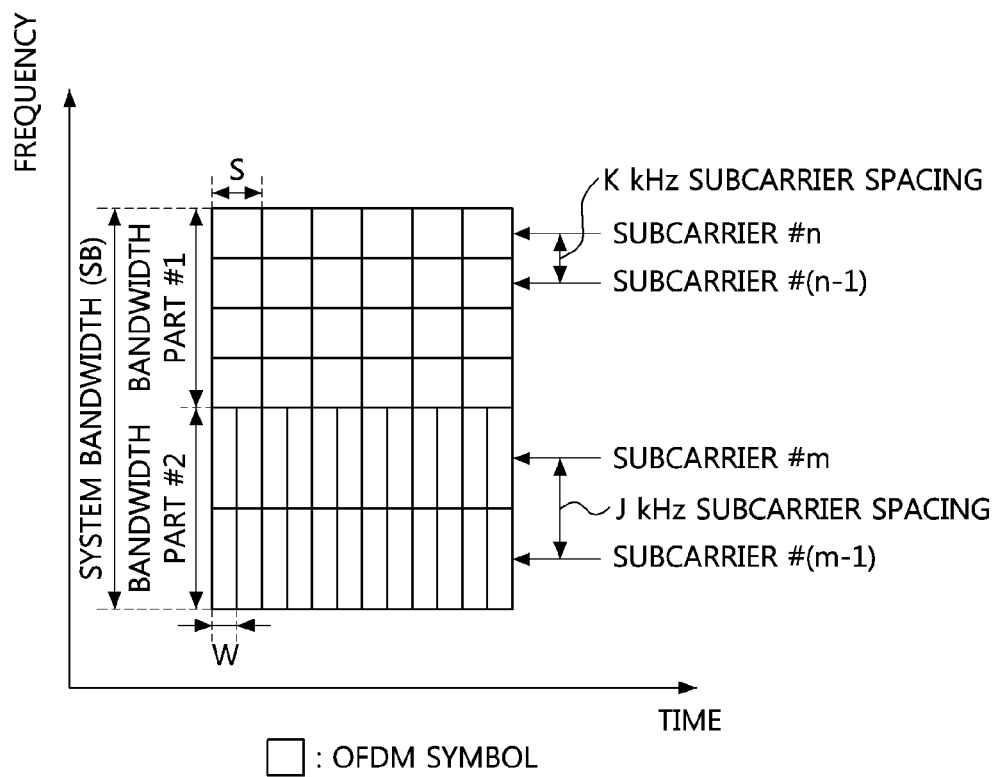
FIG. 10 is a conceptual diagram illustrating a first embodiment of a bandwidth part configuration in a wireless communication network.

FIG. 10 is a conceptual diagram illustrating a first embodiment of a bandwidth part configuration in a wireless communication network.

Referring to FIG. 10, a system bandwidth SB may include one or more bandwidth parts. For example, the system bandwidth SB may include a bandwidth part #1 and a bandwidth part #2. A subcarrier spacing of the bandwidth part #1 may be different from a subcarrier spacing of the bandwidth part #2. The subcarrier spacing of the bandwidth part #1 may be K kHz, in which case the base station and the UE may perform communications based on numerology according to the subcarrier spacing K kHz. The subcarrier spacing of the bandwidth part #2 may be J kHz, in which case the base station and the UE may perform communications based on numerology according to the subcarrier spacing J kHz.

The UE may transmit and receive signals in the entire system bandwidth SB or in some of the system bandwidth (SB) depending on its capability. For example, a UE capable of transmitting and receiving signals in the entire system bandwidth (SB) may be configure to transmit and receive signals in the bandwidth part #1, the bandwidth part #2, or the entire system bandwidth SB (e.g., bandwidth parts #1 and #2). A UE capable of transmitting and receiving signals in some of the system bandwidth SB may be configured to transmit and receive signals in the bandwidth part #1 or the bandwidth part #2.

Figure 11:
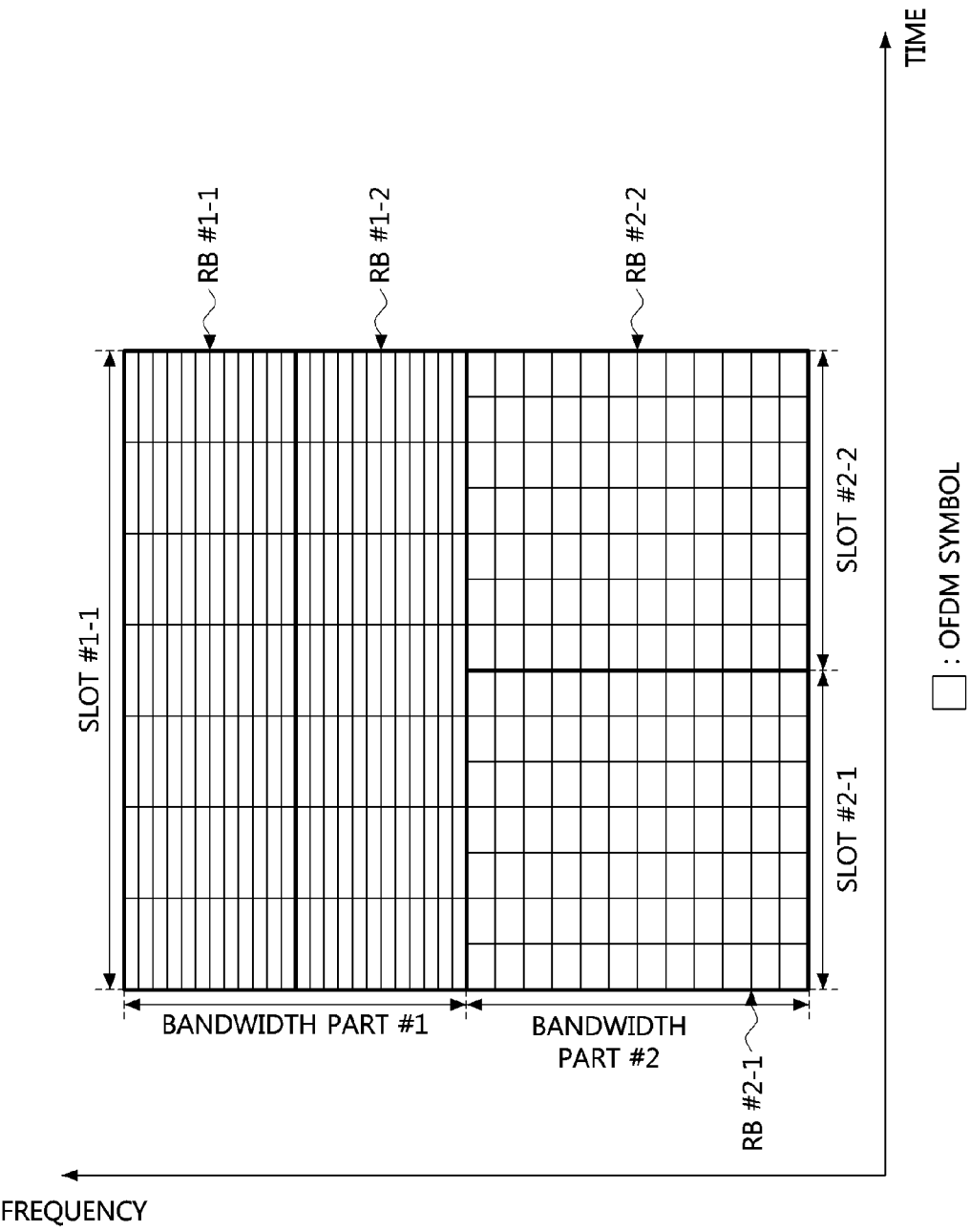
FIG. 11 is a conceptual diagram illustrating a third embodiment of time-frequency resources according to a subcarrier spacing in a wireless communication network.

FIG. 11 is a conceptual diagram illustrating a third embodiment of time-frequency resources according to a subcarrier spacing in a wireless communication network.

Referring to FIG. 11, a subcarrier spacing of a bandwidth part #1 may be different from a subcarrier spacing of a bandwidth part #2. For example, the subcarrier spacing of the bandwidth part #2 may be twice the subcarrier spacing of the bandwidth part #1. The slot may be defined regardless of the subcarrier spacing. For example, one slot may be composed of 7 OFDM symbols regardless of the length of the OFDM symbol. In this case, in the same time period, one slot (e.g., slot #1-1) may be configured in the bandwidth part #1, and two slots (e.g., slot #2-1 and slot #2-2) may be configured in the bandwidth part #2. Also, the RB may be configured with one slot in the time axis and 12 subcarriers in the frequency axis regardless of the subcarrier spacing. In this case, in the same sized time-frequency resources, two RBs (e.g., RB #1-1 and RB #1-2) may be configured in the frequency axis in the bandwidth part #1 and two RBs (e.g., RB #2-1 ad RB #2-2) may be configured in the time axis in the bandwidth part #2.

Meanwhile, in a wireless communication network, a slot may comprise 14 symbols, and a mini-slot may comprise 2, 4, or 7 symbols. The type of slot may be classified into a downlink (DL) slot, an uplink (UL) slot, and a DL/UL slot. A slot comprising only symbols used for downlink transmission may be referred to as a 'DL slot', and a slot comprising only symbols used for uplink transmission may be referred to as a 'UL slot'. A symbol used for downlink transmission may be referred to as a 'DL symbol', and a symbol used for uplink transmission may be referred to as a 'UL symbol'. A slot comprising at least one DL slot, at least one flexible symbol and at least one UL symbol may be referred to as a 'DL/UL slot'. The flexible symbol may be a symbol whose use (e.g., downlink transmission or uplink transmission) is not determined. The flexible symbol may be used for downlink transmission (i.e., DL symbol) or uplink transmission (i.e., UL symbol) depending on configuration of the base station. Alternatively, no signal may be transmitted in the flexible symbol. Here, the flexible symbol may be referred to as an 'unknown symbol', a 'gap symbol', or a 'reserved symbol'. The DL/UL slot may be configured as follows.

Figure 12A:
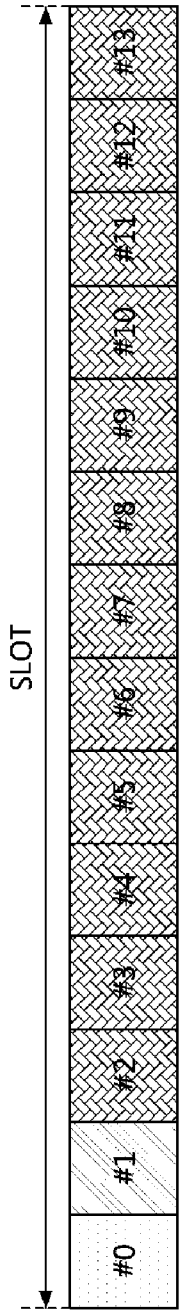
FIG. 12A is a conceptual diagram illustrating a third embodiment of a slot configuration in a wireless communication network.

FIG. 12A is a conceptual diagram illustrating a third embodiment of a slot configuration in a wireless communication network.

Referring to FIG. 12A, one slot may comprise 14 symbols. Also, one slot may comprise at least one DL symbol, at least one flexible symbol, and at least one UL symbol. For example, a symbol #0 in the slot may be a DL symbol, a symbol #1 in the slot may be a flexible symbol, and symbols #2 to #13 in the slot may be UL symbols.

Figure 12B:
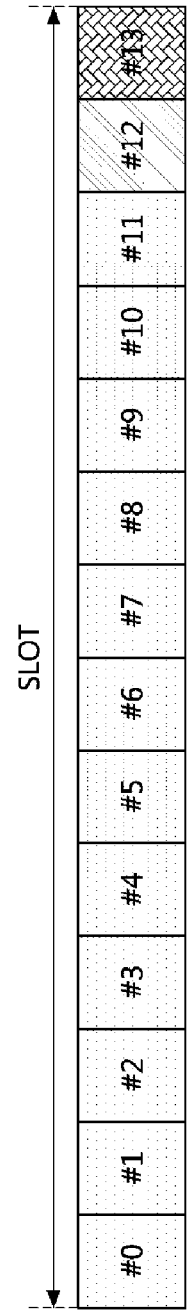
FIG. 12B is a conceptual diagram illustrating a fourth embodiment of a slot configuration in a wireless communication network.

FIG. 12B is a conceptual diagram illustrating a fourth embodiment of a slot configuration in a wireless communication network.

Referring to FIG. 12B, one slot may comprise 14 symbols. Also, one slot may comprise at least one DL symbol, at least one flexible symbol, and at least one UL symbol. For example, symbols #0 to #11 in the slot may be DL symbols, a symbol #12 in the slot may be a flexible symbol, and a symbol #13 in the slot may be a UL symbol.

Figure 12C:
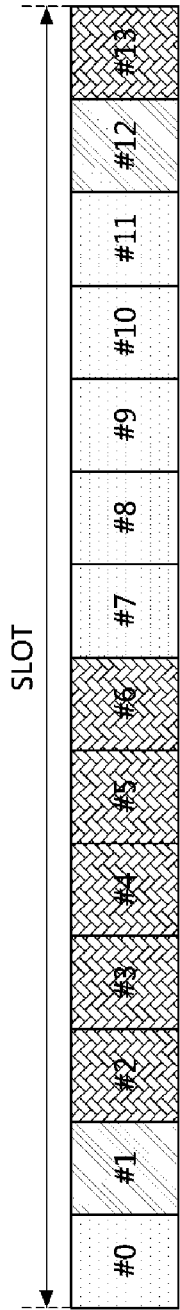
FIG. 12C is a conceptual diagram illustrating a fifth embodiment of a slot configuration in a wireless communication network.

FIG. 12C is a conceptual diagram illustrating a fifth embodiment of a slot configuration in a wireless communication network.

Referring to FIG. 12C, one slot may comprise 14 symbols. Also, one slot may comprise at least one DL symbol, at least one flexible symbol, and at least one UL symbol. For example, symbols #0 and #7 to #11 in the slot may be DL symbols, symbols #1 and #12 in the slot may be flexible symbols, and symbols #2 to #6 and #13 in the slot may be UL symbols.

In the wireless communication system, a slot structure (or, slot format) may not be limited to the embodiments shown in FIGS. 12A to 12C. That is, the slots may be configured in various ways. However, the symbol #0 in the slot may be limited to a DL symbol. In order to switch from DL symbol(s) to UL symbol(s), at least one flexible symbol may be required. That is, at least one flexible symbol may be located between the DL symbol(s) and the UL symbol(s). In order to switch from UL symbol(s) to DL symbol(s), a flexible symbol may not be required. The arrangement order of the symbols in the slot may be "DL symbol→Flexible symbol→UL symbol".

Meanwhile, a slot format indication (SFI) indicating a slot configuration (e.g., a slot structure) may be configured. The SFI may indicate the types (e.g., DL symbol, flexible symbol, UL symbol) of symbols constituting a slot. Also, the SFI may include information indicating at least one of the number of DL symbols, the number of flexible symbols, and the number of UL symbols included in the slot. The SFI may indicate a configuration of a slot in which the corresponding SFI is transmitted. Alternatively, the SFI may indicate a configuration of a slot #n+k after a slot #n in which the corresponding SFI is transmitted. Here, n may be an integer equal to or greater than 0, and k may be an integer equal to or greater than 1.

The base station may transmit the SFI to the UE, and the UE may identify the slot configuration based on the SFI received from the base station. The SFI may be included in system information, an upper layer message (e.g., a radio resource control (RRC) message), or a downlink control information (DCI).

SFI Configured as a Bitmap

The SFI may be configured as a bitmap. When a slot comprises 14 symbols, the size of the SFI may be 14 bits. In this case, one bit in the SFI may indicate the type (e.g., DL symbol, flexible symbol, or UL symbol) of the symbol corresponding to the corresponding bit. For example, a bit set to '0' may indicate that the type of the symbol corresponding to the bit is a DL symbol, and the bit set to '1' may indicate that the type of the symbol corresponding to the bit is a UL symbol. Alternatively, a bit set to '0' may indicate that the type of the symbol corresponding to the bit is a UL symbol, and the bit set to '1' may indicate that the type of the symbol corresponding to the bit is a DL symbol.

When a bit indicating a DL symbol is set to '1' and a bit indicating a UL symbol is set to '0', the SFI indicating the slot structure shown in FIG. 12A may be set to '1x0000000000', the SFI indicating the slot structure shown in FIG. 12B may be set to '111111111111x0', and the SFI indicating the slot structure shown in FIG. 12C may be set to '1x0000011111x0'.

A bit value indicating a flexible symbol may be configured equally to the bit value indicating a DL symbol or a UL symbol. For example, when a bit indicating a DL symbol or a flexible symbol is set to '1' and a bit indicating a UL symbol is set to '0', the SFI indicating the slot structure shown in FIG. 12A may be se to '11000000000000'. In this case, the UE receiving the SFI may determine that the symbol #1 before the starting UL symbol (i.e., the symbol #2) in the slot is a flexible symbol. Here, the starting UL symbol may be the UL symbol in the frontmost position in the time axis among UL symbols constituting a UL burst in the slot, and the UL burst may be composed of one or more consecutive UL symbols.

Alternatively, when a bit indicating a DL symbol is set to '1' and a bit indicating a UL symbol or a flexible symbol is set to '0', the SFI indicating the slot structure shown in FIG. 12B may be se to '11111111111100'. In this case, the UE receiving the SFI may determine that the symbol #12 after the ending DL symbol (i.e., the symbol #11) in the slot is a flexible symbol. Here, the ending DL symbol may be the DL symbol in the backmost in the time axis among DL symbols constituting a DL burst in the slot, and the DL burst may be composed of one or more consecutive DL symbols.

The DL burst and the UL burst may be configured as follows.

Figure 13:
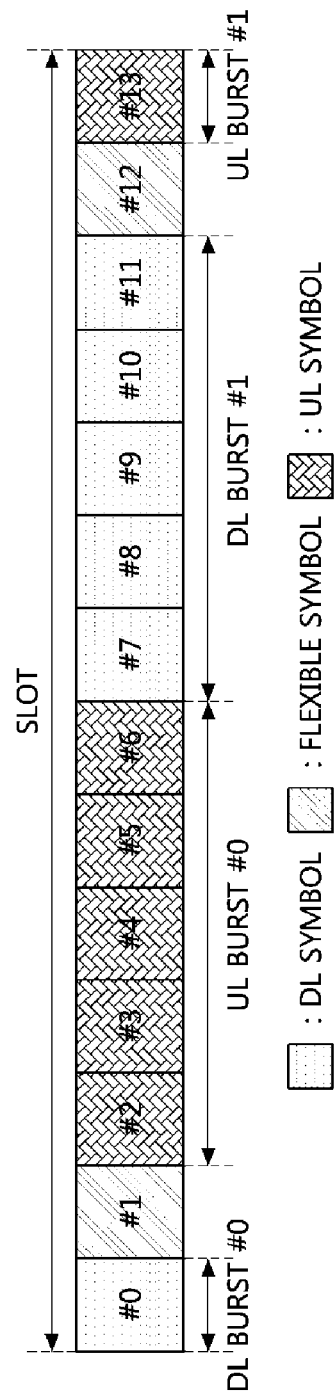
FIG. 13 is a conceptual diagram illustrating a sixth embodiment of a slot configuration in a wireless communication network.

FIG. 13 is a conceptual diagram illustrating a sixth embodiment of a slot configuration in a wireless communication network.

Referring to FIG. 13, one slot may comprise 14 symbols. Also, one slot may comprise at least one DL symbol, at least one flexible symbol, and at least one UL symbol. For example, symbols #0 and #7 to #11 in the slot may be DL symbols, symbols #1 and #12 in the slot may be flexible symbols, and symbols #2 to #6 and #13 in the slot may be UL symbols.

In the slot, at least one DL burst and at least one UL burst may be configured. A DL burst #0 may include the symbol #0, and a DL burst #1 may include the symbols #7 to #11. A UL burst #0 may include the symbols #2 to #6, and a UL burst #1 may include the symbol #13.

SFI Indicating a Starting/Ending Symbol Index

On the other hand, the SFI may be configured using an index (e.g., number) of the ending DL symbol in the slot. In this case, since the ending DL symbol in the DL burst #0 is the symbol #0 and the ending DL symbol in the DL burst #1 is the symbol #11 in the slot shown in FIG. 13, the SFI may be configured to indicate at least one of the symbol #0 and the symbol #11. When the SFI indicates the symbol #0, the UE may determine that the symbol #0 is the ending DL symbol, the symbol #1 is a flexible symbol, and UL symbols are present from the symbol #2. When the SFI indicates the symbol #11, the UE may determine that the symbol #11 is the ending DL symbol, the symbol #12 is a flexible symbol, and the symbol #13 is a UL symbol.

Alternatively, the SFI may be configured using an index (e.g., number) of the starting UL symbol in the slot. In this case, since the starting UL symbol in the UL burst #0 is the symbol #2 and the starting UL symbol in the UL burst #1 is the symbol #13 in the slot shown in FIG. 13, the SFI may be configured to indicate at least one of the symbol #2 and the symbol #13. When the SFI indicates the symbol #2, the UE may determine that the symbol #2 is the starting UL symbol, the symbol #1 is a flexible symbol, and the symbol #0 is a DL symbol. When the SFI indicates the symbol #13, the UE may determine that the symbol #13 is the starting UL symbol, the symbol #12 is a flexible symbol, and DL symbols are present from the symbol #11.

Meanwhile, the use of the flexible symbol may not be indicated by the SFI (e.g., common SFI), and may be indicated by an upper layer message (e.g., dedicated SFI) transmitted later. For example, the flexible symbol may be overridden to be a DL symbol or a UL symbol by an upper layer message (e.g., dedicated SFI).

SFI Indicating a Predefined Slot Structure

The slot structures may be predefined, in which case the SFI may indicate a predefined slot structure. The SFI indicating a predefined slot structure may be referred to as a 'UL/DL configuration'. For example, when a normal cyclic prefix (CP) is used in the wireless communication network, slot structures may be defined as shown in Tables 1 to 3 below. Here, 'D' may indicate a DL symbol, 'F' may indicate a flexible symbol, and 'U' may indicate a UL symbol. Each of the SFIs #0 to #55 may indicate a slot structure corresponding to the corresponding index, and the SFI may be configured with one or more indices among the indexes (i.e., #0 to #55) defined in Tables 1 to 3 below.

TABLE 1

| Index | \multicolumn{14}{c}{Symbol index in Slot} |||||||||||||||
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |

TABLE 2

| Index | \multicolumn{14}{c}{Symbol index in Slot} |||||||||||||||
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | X | U | U |
| 32 | D | D | D | D | D | D | D | D | D | X | X | X | U | U |
| 33 | D | D | D | D | D | D | D | X | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |

TABLE 3

| Index | \multicolumn{14}{c}{Symbol index in Slot} |||||||||||||||
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | X | X | X | U | U | U |
| 46 | D | D | D | D | X | U | D | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | X | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | D | D | D | D | D | D | D | D |
| 55 | D | D | X | X | X | U | U | U | D | D | D | D | D | D |

When an extended cyclic prefix (CP) is used in the wireless communication network, slot structures may be defined as shown in Tables 4 to 6 below. Each of the SFIs #0 to #55 may indicate a slot structure corresponding to the corresponding index, and the SFI may be configured with one or more indices among the indexes (i.e., #0 to #55) defined in Tables 4 to 6 below.

TABLE 4

| | Symbol index in Slot | | | | | | | | | | | |
|---|---|---|---|---|---|---|---|---|---|---|---|---|
| Index | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | X |
| 4 | D | D | D | D | D | D | D | D | D | D | X | X |
| 5 | D | D | D | D | D | D | D | D | D | X | X | X |
| 6 | D | D | D | D | D | D | D | D | X | X | X | X |
| 7 | D | D | D | D | D | D | D | X | X | X | X | X |
| 8 | X | X | X | X | X | X | X | X | X | X | X | U |
| 9 | X | X | X | X | X | X | X | X | X | X | U | U |
| 10 | X | U | U | U | U | U | U | U | U | U | U | U |
| 11 | X | X | U | U | U | U | U | U | U | U | U | U |
| 12 | X | X | X | U | U | U | U | U | U | U | U | U |
| 13 | X | X | X | X | U | U | U | U | U | U | U | U |
| 14 | X | X | X | X | X | U | U | U | U | U | U | U |
| 15 | X | X | X | X | X | X | U | U | U | U | U | U |
| 16 | D | X | X | X | X | X | X | X | X | X | X | X |
| 17 | D | D | X | X | X | X | X | X | X | X | X | X |
| 18 | D | D | D | X | X | X | X | X | X | X | X | X |
| 19 | D | X | X | X | X | X | X | X | X | X | X | U |
| 20 | D | D | X | X | X | X | X | X | X | X | X | U |

TABLE 5

| | Symbol index in Slot | | | | | | | | | | | |
|---|---|---|---|---|---|---|---|---|---|---|---|---|
| Index | 0 | 1 | 2 | 3 | 4 | 5 | 6 | 7 | 8 | 9 | 10 | 11 |
| 21 | D | D | D | X | X | X | X | X | X | X | X | U |
| 22 | D | X | X | X | X | X | X | X | X | X | U | U |
| 23 | D | D | X | X | X | X | X | X | X | X | U | U |
| 24 | D | D | D | X | X | X | X | X | X | X | U | U |
| 25 | D | X | X | X | X | X | X | X | X | U | U | U |
| 26 | D | D | X | X | X | X | X | X | X | U | U | U |
| 27 | D | D | D | X | X | X | X | X | X | U | U | U |
| 28 | D | D | D | D | D | D | D | D | D | D | X | U |
| 29 | D | D | D | D | D | D | D | D | D | X | X | U |
| 30 | D | D | D | D | D | D | D | X | X | X | X | U |
| 31 | D | D | D | D | D | D | D | D | D | X | U | U |
| 32 | D | D | D | D | D | D | D | D | X | X | U | U |
| 33 | D | D | D | D | D | D | D | X | X | X | U | U |
| 34 | D | X | U | U | U | U | U | U | U | U | U | U |
| 35 | D | D | X | U | U | U | U | U | U | U | U | U |
| 36 | D | D | D | X | U | U | U | U | U | U | U | U |
| 37 | D | X | X | U | U | U | U | U | U | U | U | U |
| 38 | D | D | X | X | U | U | U | U | U | U | U | U |
| 39 | D | D | D | X | X | U | U | U | U | U | U | U |
| 40 | D | X | X | X | U | U | U | U | U | U | U | U |

TABLE 6

| | Symbol index in Slot | | | | | | | | | | | |
|---|---|---|---|---|---|---|---|---|---|---|---|---|
| Index | 0 | 1 | 2 | 3 | 4 | 5 | 6 | 7 | 8 | 9 | 10 | 11 |
| 41 | D | D | X | X | X | U | U | U | U | U | U | U |
| 42 | D | D | D | X | X | X | U | U | U | U | U | U |
| 43 | D | D | D | D | D | X | X | X | X | X | U | U |
| 44 | D | D | D | D | X | X | X | X | X | X | U | U |
| 45 | D | D | D | D | X | X | U | U | U | U | U | U |
| 46 | D | D | D | D | X | U | D | D | D | X | U | U |
| 47 | D | D | X | U | U | U | D | D | X | U | U | U |
| 48 | D | X | U | U | U | U | D | X | U | U | U | U |
| 49 | D | D | D | X | X | U | D | D | D | X | X | U |
| 50 | D | D | X | X | U | U | D | D | X | X | U | U |
| 51 | D | X | X | U | U | U | D | X | X | U | U | U |
| 52 | D | X | X | X | X | U | D | X | X | X | X | U |
| 53 | D | D | X | X | X | U | D | D | X | X | X | U |
| 54 | X | X | X | X | X | X | D | D | D | D | D | D |
| 55 | D | D | X | X | X | U | U | U | D | D | D | D |

The base station may transmit configuration information (e.g., configuration information of a slot structure defined in Tables 1 to 6) indicating a usable slot structure through system information or an upper layer message. Here, the configuration information indicating a usable slot structure may be referred to as 'slot configuration information'. When the slot configuration information is transmitted through system information (e.g., system information included in a synchronization/physical broadcast channel (SS/PBCH) block, remaining minimum system information (RMSI), or other system information (OSI)), the slot configuration information may be used commonly by UEs belonging to a cell of the base station. Alternatively, when the slot configuration information is transmitted through an upper layer message (e.g., a UE-specific RRC message or a UE-dedicated RRC message), the slot configuration information may be differently configured for each UE. The UE may obtain the slot configuration information through the system information or the upper layer message. Alternatively, the slot configuration information may be preconfigured in the base station and the UE.

After the signaling of the slot configuration information is completed, the base station may transmits an SFI (e.g., SFI indicating one or more of the indices #0 to #55 defined in Tables 1 to 3, or indices #0 to #55 defined in Tables 4 to 6) through system information or an upper layer message. The SFI may be transmitted through a cell-specific RRC message, in which case all UEs (i.e., UEs receiving the SFI through the cell-specific RRC message) in the cell of the base station may use the slot structure indicated by the same SFI. The cell-specific RRC message may further include information indicating a slot configuration period for which the SFI is applied. The slot configuration period may be configured in units of slots or subframes.

Alternatively, when the SFI is transmitted through a UE-specific RRC message (or a UE-dedicated RRC message), different SFIs may be transmitted to the respective UEs belonging to the cell of the base station. For example, the base station may transmit a UE-specific RRC message indicating the SFI #0 to a UE #0 and a UE-specific RRC message indicating the SFI #1 to a UE #1. In this case, the UE #0 may perform communication using the slot structure corresponding to the SFI #0 configured by the UE-specific RRC message from the base station, and the UE #1 may perform communication using the slot structure corresponding to the SFI #1 configured by the UE-specific RRC message from the base station. The UE-specific RRC message may further include information indicating a slot configuration period for which the SFI is applied. The slot configured period may be configured in units of slots or subframes.

On the other hand, the base station may transmit a cell-specific RRC message indicating a common SFI, and may then transmit a UE-specific RRC message indicating a dedicated SFI. The common SFI may be an SFI used by all the UEs belonging to the cell of the base station, and the dedicated SFI may be an SFI used by a specific UE belonging to the cell of the base station. The UE may receive the common SFI through the cell-specific RRC message from the base station and may receive the dedicated SFI through the UE-specific RRC message from the base station. In this case, the UE may override the common SFI based on the dedicated SFI. For example, the dedicated SFI may indicate the use (e.g., downlink transmission or uplink transmission) of the flexible symbol included in the slot configured by the common SFI. Accordingly, based on the dedicated SFI, the UE may override the flexible symbol (e.g., the flexible symbol configured by the common SFI) to a DL symbol or a UL symbol.

Alternatively, the base station may transmit the SFI through a physical downlink control channel (PDCCH) (e.g., a common PDCCH (or, group common PDCCH) received by a plurality of UEs in the cell of the base station or a PDCCH received by a specific UE). In this case, the base station may transmit at least one of information indicating whether to monitor the PDCCH, information indicating a monitoring periodicity of the PDCCH, and resources (e.g., a search space set and a control resource set (CORESET)) through which the PDCCH is transmitted through an upper layer message.

The UE may receive the upper layer message from the base station, may receive the PDCCH based on the information configured by the upper layer message (e.g., the information for monitoring the PDCCH), and may obtain the SFI from the PDCCH. The PDCCH may further include information indicating a slot configuration period for which the SFI is applied. The slot configured period may be configured in units of slots or subframes. The UE may perform communication according to the slot structure indicated by the SFI. However, when the SFI configured by the cell-specific RRC message or the UE-specific RRC message already exists, the UE may update the SFI configured by the cell-specific RRC message or the UE-specific RRC message based on the SFI obtained through the PDCCH, and perform communication based on the updated SFI.

Meanwhile, after the SFI is configured by at least one of the cell-specific RRC message, the UE-specific RRC message and the PDCCH, the base station may transmit a DCI including scheduling information (e.g., downlink scheduling information or uplink scheduling information), and perform downlink transmission or uplink reception based on the scheduling information. When a slot corresponding to the already-configured SFI includes a flexible symbol and the scheduling information indicates a downlink transmission in the corresponding slot (e.g., in the flexible symbol), the UE may determine that the flexible symbol included in the slot corresponding to the already-configured SFI is overridden to a DL symbol, and receive a DL channel or a DL signal in the corresponding flexible symbol. Alternatively, when a slot corresponding to the already-configured SFI includes a flexible symbol and the scheduling information indicates an uplink transmission in the corresponding slot (e.g., in the flexible symbol), the UE may determine that the flexible symbol included in the slot corresponding to the already-configured SFI is overridden to a UL symbol, and receive a UL channel or a UL signal in the corresponding flexible symbol.

In summary of the embodiments described above, the SFI may be configured as follows.

1. An SFI may be configured through a cell-specific RRC message (or, system information).
2. The SFI configured by the cell-specific RRC message may be overridden (i.e., updated) by a UE-specific RRC message (i.e., an SFI included in the UE-specific RRC message).
3. The SFI configured by the cell-specific RRC message or the UE-specific RRC message may be overridden by a PDCCH (i.e., an SFI included in the PDCCH).
4. The SFI configured by the cell-specific RRC message, the UE-specific RRC message, or the PDCCH (i.e., the SFI included in the PDCCH) may be overridden by a PDCCH (i.e., scheduling information included in the PDCCH).

The priority of the SFI may vary according to a transmission scheme of the SFI, and the UE may update the SFI based on the priority of the SFI. For example, the SFI or scheduling information received through the PDCCH may have the highest priority, the SFI received through the UE-specific RRC message may have a next priority, and the SFI received through the cell-specific RRC message (or, system information) may have the lowest priority. Also, when a plurality of SFIs having the same priority are received, the UE may determine a slot structure based on the most recently received SFI. If the flexible symbol in the slot is not overridden by the SFI or scheduling information to a DL slot or a UL slot, the UE may not perform downlink reception or uplink transmission in the corresponding flexible symbol.

Meanwhile, when the SFI indicates a structure of one slot, the SFI may be signaled (e.g., through upper layer signaling) together with information indicating a slot configured period for which the SFI is applied. The information indicating the slot configuration period may indicate one or more consecutive slots or one or more consecutive subframes. For example, when the information indicating the slot configuration period indicates 5 slots, the SFI may be applied from a slot #n in which the corresponding SFI is transmitted to a slot #n+4. Here, n may be an integer equal to or greater than 0. Also, the monitoring periodicity of the SFI may be configured by an upper layer message. In this case, the information indicating the slot configuration period may be configured to be the same as the monitoring periodicity of the SFI.

Alternatively, the SFI may indicate a structure of each of the k slots, and k may be an integer greater than or equal to 2. In this case, the SFI may include k subfields. For example, when k is 3, the SFI may include subfields #0 to #2. In this case, the subfield #0 of the SFI may indicate an SFI applied to the slot #n, the subfield #1 of the SFI may indicate an SFI applied to the slot #n+1, and the subfield #2 may indicate an SFI applied to slot #n+2. Here, the slot #n may be a slot in which the SFI is received, and the SFI may indicate a structure of each of 3 consecutive slots.

On the other hand, in the embodiment shown in FIG. 11 described above, a slot structure for each of bandwidth parts having different subcarrier spacing may be indicated by the SFI. For example, an SFI indicating a slot structure for the bandwidth part #1 may be transmitted, and an SFI indicating a slot structure for the bandwidth part #2 may be transmitted.

Figure 14:
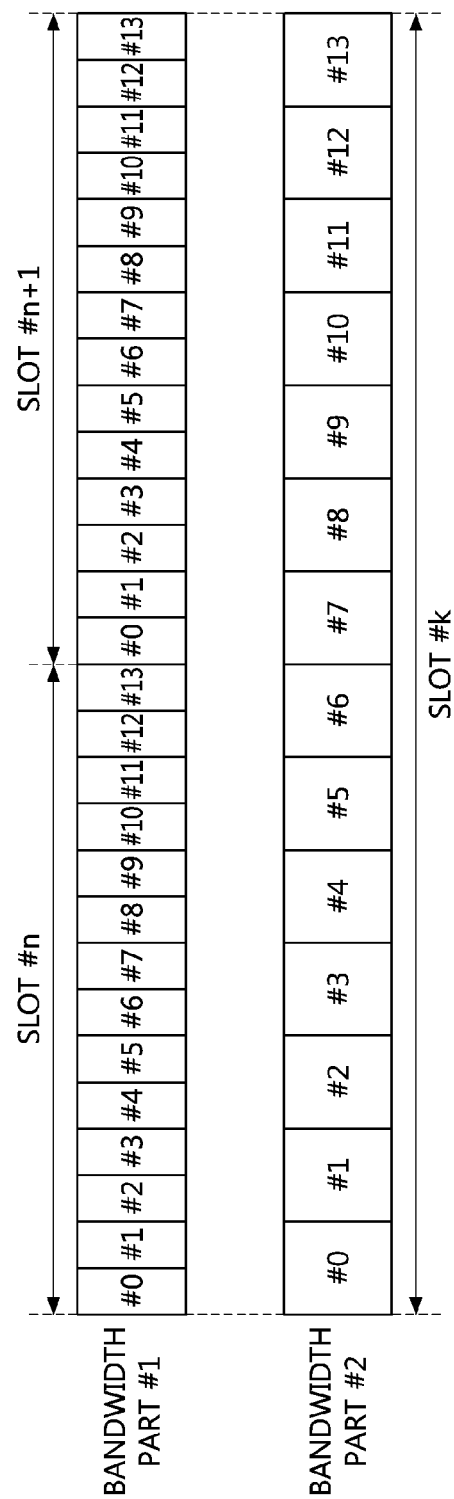
FIG. 14 is a conceptual diagram illustrating a first embodiment of a slot structure for each bandwidth part in a wireless communication network.

FIG. 14 is a conceptual diagram illustrating a first embodiment of a slot structure for each bandwidth part in a wireless communication network.

Referring to FIG. 14, a subcarrier spacing of a bandwidth part #1 may be 30 kHz and a subcarrier spacing of a bandwidth part #2 may be 15 kHz. One slot in the bandwidth parts #1 and #2 may comprise 14 symbols. In this case, a time duration corresponding to one slot of the bandwidth part #2 may be the same as a time duration corresponding to 2 slots of the bandwidth part #1. That is, one slot of the bandwidth part #2 may be aligned in time axis with 2 slots of the bandwidth part #1. Here, the bandwidth part #1 may be an active DL bandwidth part, and the bandwidth part #2 may be an active UL bandwidth part. Alternatively, the bandwidth part #1 may be an active UL bandwidth part, and the bandwidth part #2 may be an active DL bandwidth part. The DL bandwidth part may be used for downlink transmission, and the UL bandwidth part may be used for uplink transmission.

A slot structure usable for each of the bandwidth parts #1 and #2 may be configured. The slot structure for the bandwidth part #1 may be the same as the slot structure for the bandwidth part #2. In this case, configuration information indicating slot structures usable for the bandwidth parts #1 and #2 (e.g., slot structure configuration information defined in Tables 1 to 6) may be the same. Alternatively, the slot structure for the bandwidth part #1 may be different from the slot structure for the bandwidth part #2. In this case, configuration information indicating a slot structure for the bandwidth part #1 may be different from configuration information indicating a slot structure for the bandwidth part #2. Configuration information indicating slot structures usable for UEs operating within the same bandwidth part may be the same. Alternatively, configuration information indicating slot structures usable for UEs operating within the same bandwidth part may be different.

Meanwhile, the base station may transmit the SFI applied to the bandwidth part #1 to the UE through a PDCCH (or upper layer message) located in the bandwidth part #1. Alternatively, the base station may transmit the SFI applied to the bandwidth part #1 to the UE through a PDCCH located in another bandwidth part (e.g., the bandwidth part #2). In this case, the PDCCH located in the bandwidth part #2 may be used to transmit at least one of the SFI applied to the bandwidth part #1 and the SFI applied to the bandwidth part #2. Accordingly, the UE may obtain the SFI applied to the bandwidth part #1 and the SFI applied to the bandwidth part #2 from the PDCCH received in the bandwidth part #2. The UE may perform communication in the bandwidth part #1 based on the SFI applied to the bandwidth part #1, and may perform communication in the bandwidth part #2 based on the SFI applied to the bandwidth part #2.

If the SFIs applied to the bandwidth parts are the same, the base station may transmit the SFI through a PDCCH (e.g., upper layer message) in one of the bandwidth parts to which the same SFI is applied. For example, when the same SFI is applied to the bandwidth parts #1 and #2, the base station may transmit the SFI in a PDCCH in the bandwidth part #2. The UE may obtain the SFI from the PDCCH received in the bandwidth part #2, determine that the obtained SFI is applied to the bandwidth parts #1 and #2, and determine a slot structure for the bandwidth parts #1 and #2 based on the obtained SFI. For example, if the SFI #33 defined in Table 2 is obtained, the slot structures for the bandwidth parts #1 and #2 may be as follows.

Figure 15:
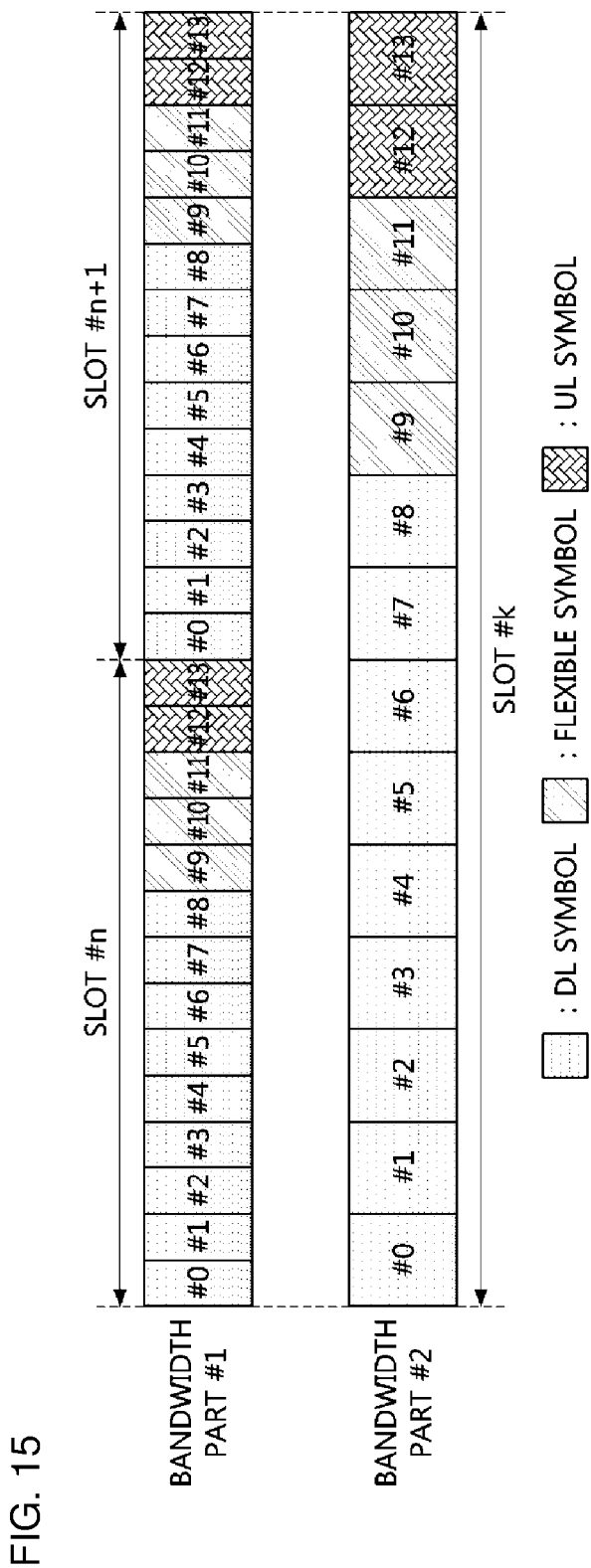
FIG. 15 is a conceptual diagram illustrating a second embodiment of a slot structure for each bandwidth part in a wireless communication network.

FIG. 15 is a conceptual diagram illustrating a second embodiment of a slot structure for each bandwidth part in a wireless communication network.

Referring to FIG. 15, a subcarrier spacing of a bandwidth part #1 may be 30 kHz and a subcarrier spacing of a bandwidth part #2 may be 15 kHz. One slot in the bandwidth parts #1 and #2 may comprise 14 symbols. In this case, a time duration corresponding to one slot of the bandwidth part #2 may be the same as a time duration corresponding to 2 slots of the bandwidth part #1. That is, one slot of the bandwidth part #2 may be aligned in time axis with 2 slots of the bandwidth part #1. Here, the bandwidth part #1 may be an active DL bandwidth part, and the bandwidth part #2 may be an active UL bandwidth part. Alternatively, the bandwidth part #1 may be an active UL bandwidth part, and the bandwidth part #2 may be an active DL bandwidth part.

When the SFI #33 defined in Table 2 is obtained, the UE may determine that a structure of a slot #k in the bandwidth part #2 is 'DDDDDDDDDFFFUU'. When the SFI #33 obtained in one bandwidth part (e.g., bandwidth part #2) is also applied to another bandwidth part (e.g., bandwidth part #1), the UE may determine that a structure of each of slots #n and #n+1 in the bandwidth part #1 is 'DDDDDDDDDFFFUU'. The UE may perform downlink reception or uplink transmission according to the slot structure determined according to the SFI #33 in the bandwidth parts #1 and #2.

Generalizing the embodiment described above, when the same SFI is applied to the bandwidth parts #1 and #2, the base station may transmit, in the bandwidth part #2, a DCI or an upper layer message including the SFI indicating the format of the slot #k belonging to the bandwidth part #2 having a subcarrier spacing of m kHz. The UE may receive the SFI in the bandwidth part #2, and based on the SFI, the UE may determine the types of symbols included in the slot #k of the bandwidth part #2. Also, based on the SFI, the UE may determine the types of symbols included in slots #n to #(n+2'-1) belonging to the bandwidth part #1 having a subcarrier spacing of $2^u \times m$ kHz. Particularly, the type of a symbol #p included in each of the slots #n to #(n+2$^u$−1) may be determined to be the same as the type of a symbol #p belonging to the slot #k. That is, the slot structure of the bandwidth part #2 according to the SFI may be repeated 2 times in the bandwidth part #1. Here, m may be 15, 30, 60, 120, or 240, u may be an integer equal to or greater than 1, and p may be an integer equal to or greater than 0.

In another embodiment, when the SFI #33 defined in Table 2 is obtained, the slot structures in the bandwidth parts #1 and #2 may be as follows.

Figure 16:
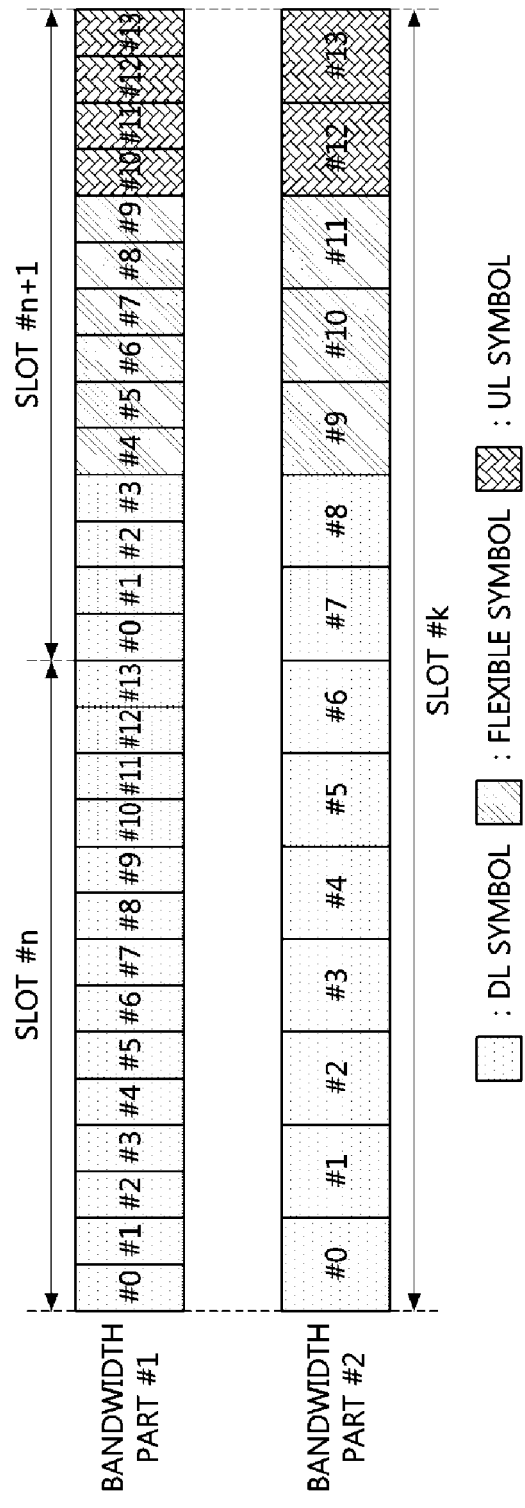
FIG. 16 is a conceptual diagram illustrating a third embodiment of a slot structure for each bandwidth part in a wireless communication network.

FIG. 16 is a conceptual diagram illustrating a third embodiment of a slot structure for each bandwidth part in a wireless communication network.

Referring to FIG. 16, a subcarrier spacing of a bandwidth part #1 may be 30 kHz and a subcarrier spacing of a bandwidth part #2 may be 15 kHz. One slot in the bandwidth parts #1 and #2 may comprise 14 symbols. In this case, a time duration corresponding to one slot of the bandwidth part #2 may be the same as a time duration corresponding to 2 slots of the bandwidth part #1. That is, one slot of the bandwidth part #2 may be aligned in time axis with 2 slots of the bandwidth part #1. Here, the bandwidth part #1 may be an active DL bandwidth part, and the bandwidth part #2 may be an active UL bandwidth part. Alternatively, the bandwidth part #1 may be an active UL bandwidth part, and the bandwidth part #2 may be an active DL bandwidth part.

When the SFI #33 defined in Table 2 is obtained, the UE may determine that a structure of a slot #k in the bandwidth part #2 is 'DDDDDDDDDFFFUU', and determine a slot structure for the bandwidth part #1 according to the slot structure for the bandwidth part #2 determined based on the SFI #33. For example, the UE may estimate the types of symbols in the slots #n and #n+1 of the bandwidth part #1, which are aligned in the time axis with a specific symbol in the slot #k of the bandwidth part #2, to be the same as the type of the specific symbol. For example, since the symbol

0 in the slot #k of the bandwidth part #2 is aligned in the time axis with the symbols #0 to #1 in the slot #n of the bandwidth part #1, the types of the symbols #0 to #1 in the slot #n of the bandwidth part #1 may be set to DL symbols identically to the type of the symbol #0 in the slot #k of the bandwidth part #2.

Also, since the symbol #9 in the slot #k of the bandwidth part #2 is aligned in the time axis with the symbols #4 to #5 in the slot #n+1 of the bandwidth part #1, the types of the symbols #4 to #5 in the slot #n+1 of the bandwidth part #1 may be set to flexible symbols identically to the type of the symbol #9 in the slot #k of the bandwidth part #2. Also, since the symbol #12 in the slot #k of the bandwidth part #2 is aligned in the time axis with the symbols #10 to #11 in the slot #n+1 of the bandwidth part #1, the types of the symbols #10 to #11 in the slot #n+1 of the bandwidth part #1 may be set to UL symbols identically to the type of the symbol #12 in the slot #k of the bandwidth part #2.

Accordingly, the UE may perform downlink reception or uplink transmission according to the slot structure determined according to the SFI #33 in the bandwidth part #2, and may perform downlink reception or uplink transmission according to the slot structure for the bandwidth part #1 estimated based on the slot structure for the bandwidth part #2.

Generalizing the embodiment described above, when the same SFI is applied to the bandwidth parts #1 and #2, the base station may transmit, in the bandwidth part #2, a DCI or an upper layer message including the SFI indicating the format of the slot #k belonging to the bandwidth part #2 having a subcarrier spacing of m kHz. The UE may receive the SFI in the bandwidth part #2, and based on the SFI, the UE may determine the types of symbols included in the slot #k of the bandwidth part #2. Also, based on the SFI, the UE may determine the types of symbols included in slots #n to #(n+2$^u$−1) belonging to the bandwidth part #1 having a subcarrier spacing of 2$^u$×m kHz. Particularly, the types of 2$^u$ consecutive symbols included in the slots #n to #(n+2$^u$−1), which are aligned in the time axis with one symbol included in the slot #k, may be determined to be the same as the type of the one symbol included in the slot #k. Here, m may be 15, 30, 60, 120, or 240, and u may be an integer equal to or greater than 1.

Meanwhile, in the wireless communication network, a normal CP or an extended CP may be used, and a slot structure for each CP may be as follows.

Figure 17:
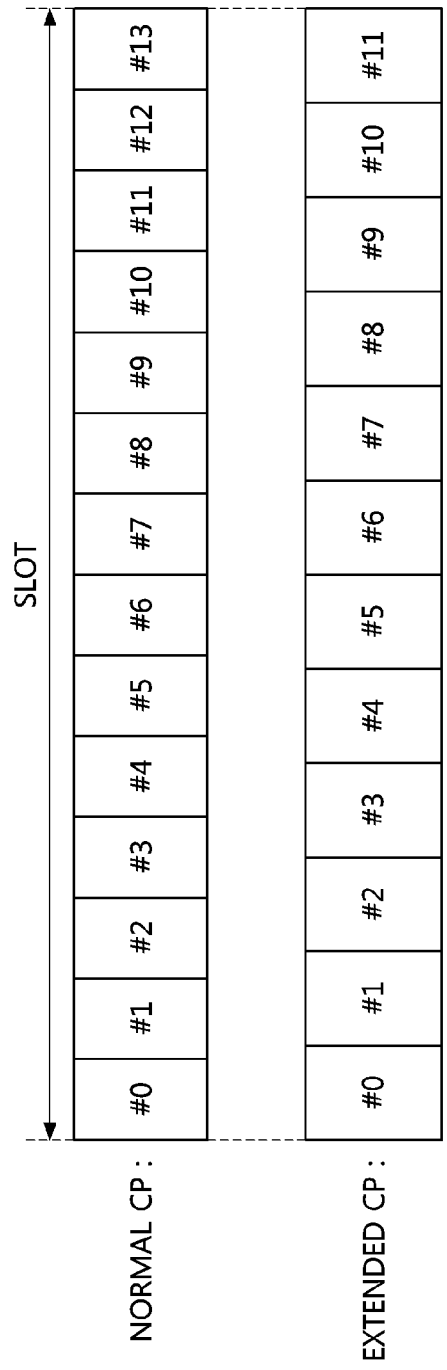
FIG. 17 is a conceptual diagram illustrating a first embodiment of a slot structure for each CP in a wireless communication network.

FIG. 17 is a conceptual diagram illustrating a first embodiment of a slot structure for each CP in a wireless communication network.

Referring to FIG. 17, one slot may comprise 14 symbols when a normal CP is used, and one slot may comprise 12 symbols when an extended CP is used. The same CP or different CPs may be used in the bandwidth parts. For example, a normal CP may be used in the bandwidth part #1, and an extended CP may be used in the bandwidth part #2.

Meanwhile, a slot structure (e.g., slot structured defined in Tables 4 to 6) for a wireless communication network in which an extended CP is used may be derived from a slot structure (e.g., slot structured defined in Tables 1 to 3) for a wireless communication network in which a normal CP is used. For example, the slot structure corresponding to the SFI #1 in Table 4 may be derived from the slot structure corresponding to the SFI #1 in Table 1. The slot structures defined in Tables 4 to 6 may be derived by excluding 2 symbols from the slot structures defined in Tables 1 to 3. Here, the 2 symbols may be determined based on a composition ratio of symbols (i.e., D:F:U) constituting the slot corresponding to the SFI in Tables 1 to 3. For example, the 2 symbols may be symbols of a type having the largest number among DL symbols, flexible symbols, and UL symbols constituting one slot.

The slot structure corresponding to the SFI #33 in Table 2 may be 'DDDDDDDDDDFFFUU', and the symbol composition ratio of the slot corresponding to the SFI #33 in Table 2 may be (9:3:2). That is, the slot may include 9 DL symbols, 3 flexible symbols, and 2 UL symbols. In this case, since the number of DL symbols in the slot is the largest, the slot corresponding to the SFI #33 in Table 5 may be derived by excluding 2 DL symbols from the slot corresponding to the SFI #33 in Table 2. Accordingly, the slot structure corresponding to the SFI #33 in Table 5 may be 'DDDDDDDFFFUU'.

Also, the slot structure corresponding to the SFI #46 in Table 3 may be 'DDDDDFUDDDDDFU', and the symbol composition ratio of the slot corresponding to the SFI #46 in Table 3 may be (10:2:2). That is, the slot may include 10 DL symbols, 2 flexible symbols, and 2 UL symbols. In this case, since the number of DL symbols in the slot is the largest, the slot corresponding to the SFI #46 in Table 6 may be derived by excluding 2 DL symbols from the slot corresponding to the SFI #46 in Table 3. In this case, one DL symbol located in the front region (i.e., symbols #0 to #6) in the slot corresponding to the SFI #46 in Table 3 and one DL symbol located in the back region (i.e., symbols #7 to #13) in the slot corresponding to the SFI #46 in Table 3 may be excluded. Accordingly, the slot structure corresponding to the SFI #46 in Table 6 may be 'DDDDFUDDDDFU'. Alternatively, bursts (e.g., a DL burst, a flexible burst and a UL burst) each of which comprises one or more consecutive symbols in the slot corresponding to the SFI defined in Tables 1 to 3 may be configured, and the slot structure defined in Tables 4 to 6 may be derived by excluding one symbol from the longest burst among the DL burst, the flexible burst, and the UL burst. That is, a method for deriving the slot structure defined in Tables 4 to 6 may be as follows.

Figure 18:
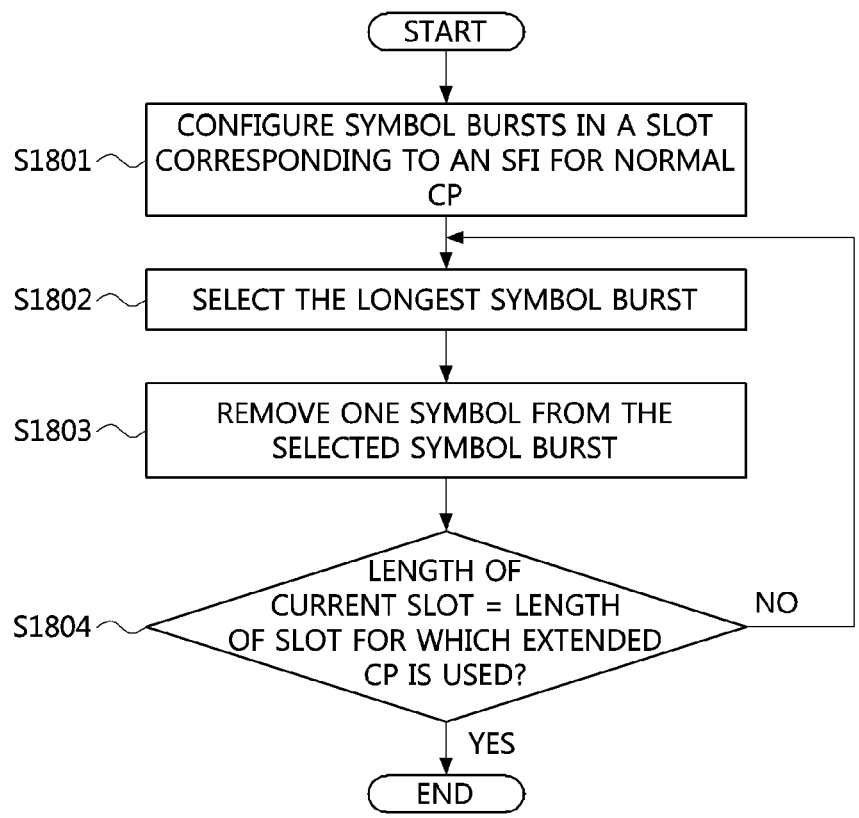
FIG. 18 is a sequence chart illustrating a first embodiment of a method for configuring a slot in a wireless communication network.

FIG. 18 is a sequence chart illustrating a first embodiment of a method for configuring a slot in a wireless communication network.

Referring to FIG. 18, a communication node (e.g., a base station or a UE) may configure symbol bursts in a slot corresponding to an SFI defined in Tables 1 to 3 (S1801). As the symbol bursts, a DL burst may be composed of one or more consecutive DL symbols, a flexible burst may be composed of one or more consecutive flexible symbols, and a UL burst may be composed of one or more consecutive UL symbols. For example, in a slot corresponding to the SFI #46 defined in Table 3, the symbol bursts may be configured as follows.

Figure 19A:
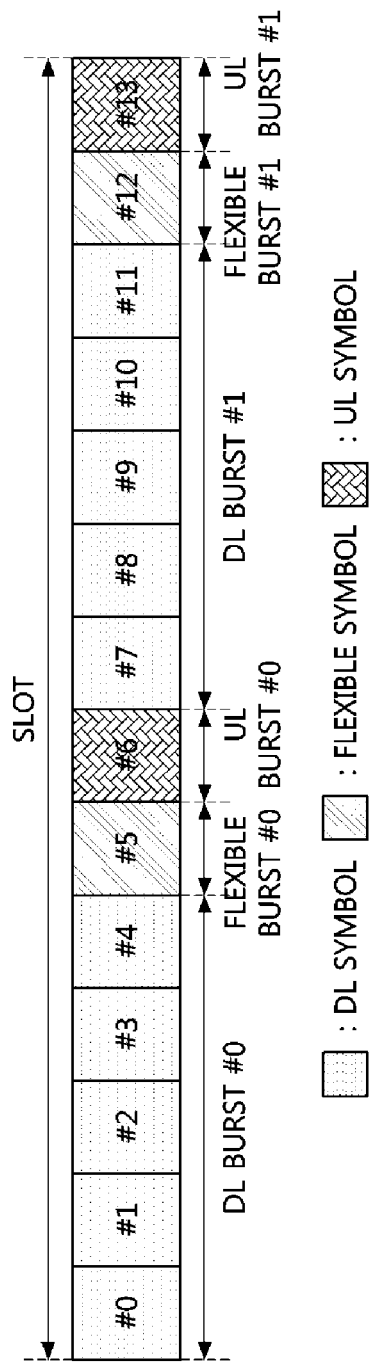
FIG. 19A is a conceptual diagram illustrating a first embodiment of symbol bursts in a slot in a wireless communication network.

FIG. 19A is a conceptual diagram illustrating a first embodiment of symbol bursts in a slot in a wireless communication network.

Referring to FIG. 19A, DL bursts #0 to #1, flexible bursts #0 to #1, and UL bursts #0 to #1 may be configured in the slot corresponding to the SFI #46 defined in Table 3. The DL burst #0 may include symbols #0 to #4, and the DL burst #1 may include symbols #7 to #11. The flexible burst #0 may include a symbol #5, and the flexible burst #1 may include a symbol #12. The UL burst #0 may include a symbol #6, and the UL burst #1 may include a symbol #13. The DL bursts #0 to #1 may be the longest among the DL bursts #0 to #1, the flexible bursts #0 to #1, and the UL bursts #0 to #1.

Referring back to FIG. 18, the communication node may select the longest symbol burst among the symbol bursts in the slot (S1802). For example, the communication node may select the DL burst #0 or the DL burst #1 in the slot shown in FIG. 19A. Here, the communication node may select the DL burst #0 ahead of the DL burst #1 in the time axis.

The communication node may remove one symbol from the selected symbol burst (S1803). For example, the communication node may remove one symbol from the DL burst #0 in the slot shown in FIG. 19A. In this case, the slot may be configured as follows.

Figure 19B:
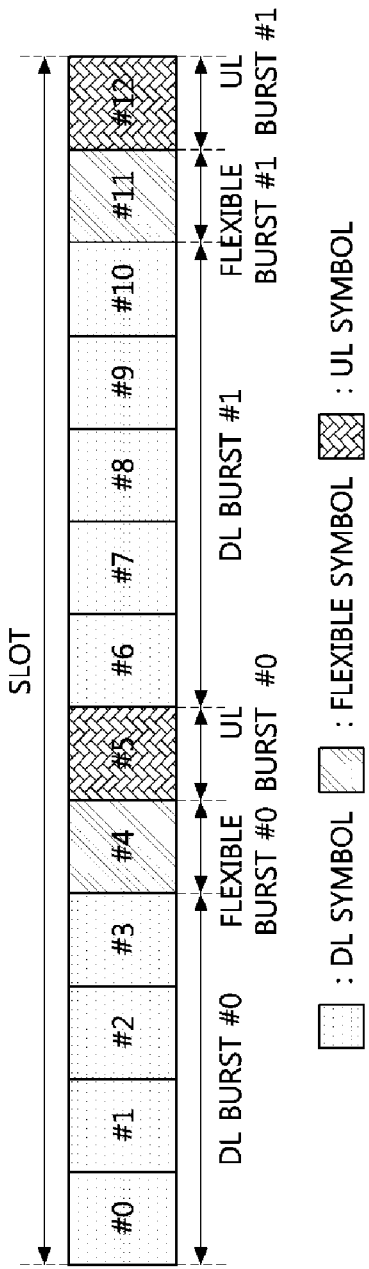
FIG. 19B is a conceptual diagram illustrating a second embodiment of symbol bursts in a slot in a wireless communication network.

FIG. 19B is a conceptual diagram illustrating a second embodiment of symbol bursts in a slot in a wireless communication network.

Referring to FIG. 19B, the slot may include 13 symbols, and the slot structure may be 'DDDDFUDDDDDFU'. DL bursts #0 to #1, flexible bursts #0 to #1, and UL bursts #0 to #1 may be configured in the slot. The DL burst #0 may include symbols #0 to #3, and the DL burst #1 may include symbols #6 to #10. The flexible burst #0 may include a symbol #4, and the flexible burst #1 may include a symbol #11. The UL burst #0 may include a symbol #5, and the UL burst #1 may include a symbol #12. The DL burst #1 may be the longest among the DL bursts #0 to #1, the flexible bursts #0 to #1, and the UL bursts #0 to #1.

Referring back to FIG. 18, the communication node may compare the number of symbols included in the slot configured in the step S1803 with the number of symbols included in a slot in the wireless communication network in which an extended CP is used (S1804). Since the number of symbols (i.e., 13) included in the slot configured in the step S1803 (i.e., 13) is different from the number of symbols (i.e., 12) included in a slot in the wireless communication network in which an extended CP is used, the communication node may perform the step S1802 again.

The communication node may select the DL burst #1 having the longest length in the slot shown in FIG. 19B (S1802). The communication node may remove one symbol from the selected DL burst #1 (S1803). In this case, the slot may be configured as follows.

Figure 19C:
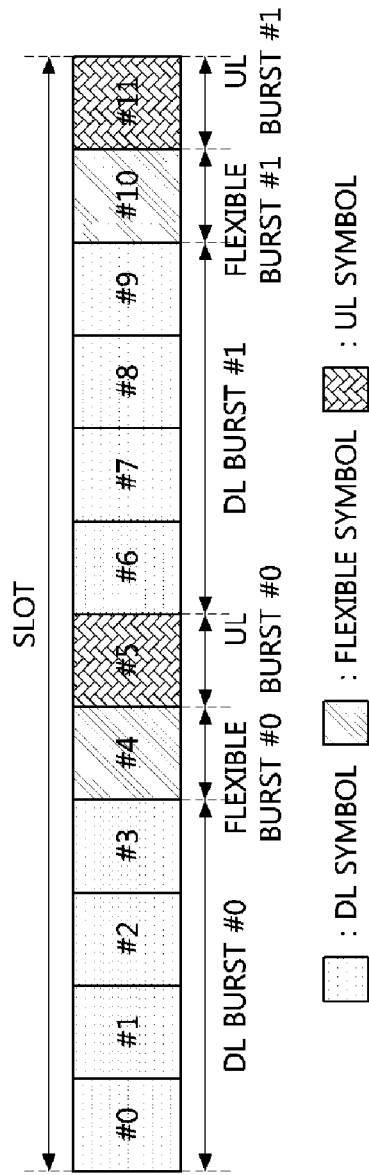
FIG. 19C is a conceptual diagram illustrating a third embodiment of symbol bursts in a slot in a wireless communication network.

FIG. 19C is a conceptual diagram illustrating a third embodiment of symbol bursts in a slot in a wireless communication network.

Referring to FIG. 19C, the slot may include 13 symbols, and the slot structure may be 'DDDDFUDDDDFU'. DL bursts #0 to #1, flexible bursts #0 to #1, and UL bursts #0 to #1 may be configured in the slot. The DL burst #0 may include symbols #0 to #3, and the DL burst #1 may include symbols #6 to #9. The flexible burst #0 may include a symbol #4, and the flexible burst #1 may include a symbol #10. The UL burst #0 may include a symbol #5, and the UL burst #1 may include a symbol #11.

Referring back to FIG. 18, the communication node may compare the number of symbols included in the slot configured in the step S1803 with the number of symbols included in a slot in the wireless communication network in which an extended CP is used (S1804). Since the number of symbols (i.e., 12) included in the slot configured in the step S1803 (i.e., 13) is equal to the number of symbols (i.e., 12) included in a slot in the wireless communication network in which an extended CP is used, the communication node may terminate the procedure for deriving the slot structure. According to the embodiment described above, Tables 4 to 6 may be derived from Tables 1 to 3.

Meanwhile, when a normal CP is used in the bandwidth part #1 and an extended CP is used in the bandwidth part #2, the base station may transmit one SFI to indicate a slot structure in the bandwidth parts #1 and #2. For example, the base station may transmit an SFI defined in Tables 1 to 3 through a PDCCH (or, upper layer message) of bandwidth part #1. The UE may receive the SFI in the PDCCH of the bandwidth part #1 and may identify the slot structure in the bandwidth part #1 based on the received SFI. For example, if the SFI #46 defined in Table 3 is received, the UE may determine that the slot structure is 'DDDDDFUDDDDDFU' in the bandwidth part #1. Also, the UE may estimate the slot structure of the bandwidth part #2 based on the SFI received through the PDCCH of the bandwidth part #1. For example, the UE may determine the slot structure of the bandwidth part #2 according to the embodiment shown in FIG. 2. When the SFI #46 defined in Table 3 is received through the PDCCH of the bandwidth part #1, the UE may determine that the slot structure of the bandwidth part #2 is 'DDDDFUDDDDFU' based on the SFI #46 received through the PDCCH of the bandwidth part #1.

On the other hand, when the UE does not know the slot structure (e.g., when the SFI is not received), the UE may determine that all the symbols constituting the slot are DL symbols, and perform monitoring for reception of a DL channel or a DL signal in the corresponding slot. For example, the base station may transmit an upper layer message to the UE, which instructs to perform downlink monitoring. The downlink monitoring may be performed as follows.

Figure 20:
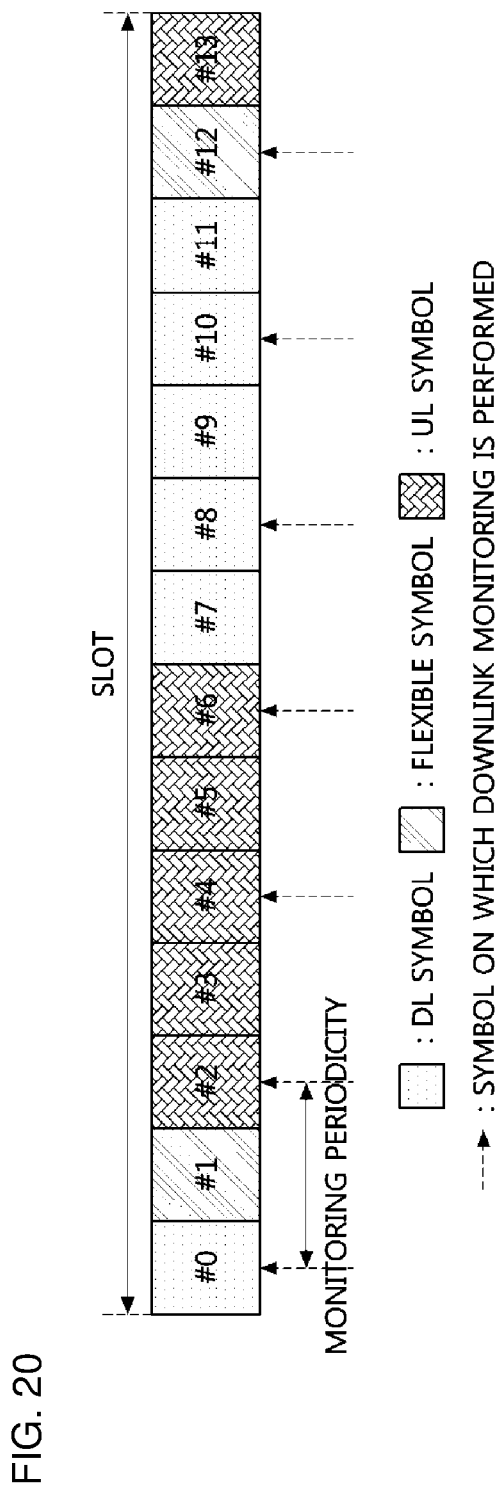
FIG. 20 is a conceptual diagram illustrating a first embodiment of a downlink monitoring periodicity of a wireless communication network.

FIG. 20 is a conceptual diagram illustrating a first embodiment of a downlink monitoring periodicity of a wireless communication network.

Referring to FIG. 20, the base station may transmit to the UE an upper layer message including information instructing to perform downlink monitoring, a downlink monitoring periodicity, and the like. The upper layer message may instruct the UE to perform downlink monitoring in a symbol satisfying an equation of (symbol index mod 2=0). In this case, the UE may perform downlink monitoring in symbols #0, #2, #4, #6, #8, #10 and #12 in the slot.

Meanwhile, when the SFI is received from the base station and a symbol according to the downlink monitoring periodicity configured by the upper layer message is a symbol configured as a UL symbol or a flexible symbol by the SFI, the UE may not perform monitoring for reception of a DL channel or signal in the corresponding symbol (i.e., the symbol configured as a UL symbol or a flexible symbol by the SFI). For example, the UE may not perform monitoring for reception of a DL channel or signal in the symbols #2, #4 and #6 configured as UL symbols by the SFI and the symbol #12 configured as a flexible symbol by the SFI.

On the other hand, when the SFI is received from the base station and a symbol according to the downlink monitoring periodicity configured by the upper layer message is a symbol configured as a DL symbol by the SFI, the UE may perform monitoring for reception of a DL channel or signal in the corresponding symbol (i.e., the symbol configured as a DL symbol by the SFI). For example, the UE may perform monitoring for reception of a DL channel or signal in the symbols #0, #8 and #10 configured as DL symbols by the SFI.

On the other hand, when the SFI indicates the ending DL symbol (i.e., symbol #11) in the DL burst, the UE may not perform monitoring for reception of a DL channel or signal in the symbols after the ending DL symbol. That is, since the symbol #12 according to the downlink monitoring periodicity configured by the upper layer message is determined as a flexible symbol, the UE may not perform monitoring for reception of a DL channel or signal in the symbol #12.

Alternatively, when the SFI indicates the starting UL symbol (i.e., symbol #13) in the UL burst, the UE may not perform monitoring for reception of a DL channel or signal in the symbols after the starting UL symbol. Further, the UE may determine that the symbol prior to the starting UL symbol (i.e., symbol #12) is a flexible symbol, and may not perform monitoring for reception of a DL channel or signal in the symbol #12 determined as a flexible symbol.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a user equipment (UE) in a communication system, the operation method comprising:
receiving from a base station a cell-specific radio resource control (RRC) message including slot format configuration and a slot configuration period to which the slot format configuration is applied, the slot format configuration including information indicating a number of downlink (DL) symbols and information indicating a number of uplink (UL) symbols;
receiving from the base station a UE-specific RRC message indicating a use of a flexible symbol belonging to the slot configuration period to which the slot format configuration is applied; and
determining the flexible symbol as a DL symbol, an UL symbol, or a flexible symbol based on the UE-specific RRC message.

2. The operation method according to claim 1, wherein a slot configured by the slot format configuration includes one or more DL symbols, one or more UL symbols, and one or more flexible symbols.

3. The operation method according to claim 1, further comprising, when the flexible symbol is determined as a DL symbol, receiving from the base station at least one of a DL channel and a DL signal in the flexible symbol.

4. The operation method according to claim 1, further comprising, when the flexible symbol is determined as a UL symbol, transmitting to the base station at least one of a UL channel and a UL signal in the flexible symbol.

5. The operation method according to claim 1, wherein an operation for transmitting or receiving a channel or a signal is not performed in the flexible symbol when the flexible symbol is determined to be maintained based on the UE-specific RRC message.

6. An operation method of a base station in a communication system, the operation method comprising:
transmitting a cell-specific radio resource control (RRC) message including a slot format configuration and a slot configuration period to which the slot format configuration is applied, the slot format configuration including information indicating a number of DL symbols and information indicating a number of UL symbols; and
transmitting downlink control information (DCI) indicating a use of a flexible symbol belonging to the slot configuration period to which the slot format configuration is applied,
wherein the flexible symbol is determined as a DL symbol, an UL symbol, or a flexible symbol based on the DCI.

7. The operation method according to claim 6, wherein the DCI includes scheduling information indicating whether the flexible symbol is used for downlink transmission or uplink transmission.

8. The operation method according to claim 6, further comprising, when the flexible symbol is determined as a DL symbol, transmitting to the UE at least one of a DL channel and a DL signal in the flexible symbol.

9. The operation method according to claim 6, further comprising, when the flexible symbol is determined as a UL symbol, receiving from the UE at least one of a UL channel and a UL signal in the flexible symbol.

10. An operation method of a user equipment (UE) in a communication system, the operation method comprising:
receiving from a base station a slot format indication (SFI) indicating a format of a slot #i belonging to a bandwidth part #1 having a subcarrier spacing of m kHz;
determining types of symbols included in the slot #i based on the SFI; and
determining types of symbols included in slots #j to #(j+$2^u$-1) belonging to a bandwidth part #2 having a subcarrier spacing of $2^u \times$m kHz based on the SFI,
wherein m is 15, 30, 60, 120 or 240, u is an integer equal to or greater than 1, each of i and j is an integer equal to or greater than 0, a type of each of the symbols is a downlink (DL) symbol, a flexible symbol, or an uplink (UL) symbol, a type of a symbol #p belonging to each of the slots #j to #(j+$2^u$-1) is determined to be identical to a type of a symbol #p belonging to the slot #i, a number of symbols belonging to each of the slots #j to #(j+$2^u$-1) is equal to a number of symbols belonging to the slot #i, and p is an integer equal to or greater than 0.

11. The operation method according to claim 10, wherein the SFI is received from the base station through a-downlink control information (DCI), and the DCI further includes information indicating a slot configuration period for which the SFI is applied.

* * * * *